United States Patent [19]

Johnson et al.

[11] Patent Number: 4,468,731
[45] Date of Patent: Aug. 28, 1984

[54] IDENTIFICATION APPARATUS FOR USE IN A CONTROLLER TO FACILITATE THE DIAGNOSIS OF FAULTS

[75] Inventors: Robert B. Johnson, Billerica; Chester M. Nibby, Jr., Peabody; Edward R. Salas, Billerica, all of Mass.

[73] Assignee: Honeywell Information Systems Inc., Waltham, Mass.

[21] Appl. No.: 330,971

[22] Filed: Dec. 15, 1981

[51] Int. Cl.³ .............................................. G06F 11/10
[52] U.S. Cl. ..................................... 364/200; 371/10
[58] Field of Search ............... 364/200, 900; 371/10, 371/11, 38

[56] References Cited

U.S. PATENT DOCUMENTS 3,803,560   4/1974   DeVoy et al. ................ 364/200
4,164,786   8/1979   Gollomp ...................... 364/200
4,359,771  11/1982   Johnson et al. ............... 364/900

Primary Examiner—Felix D. Gruber
Assistant Examiner—Tim A. Wiens
Attorney, Agent, or Firm—Faith F. Driscoll; Nicholas Prasinos

[57] ABSTRACT

A data processing system includes a main memory system which couples in common with a central processing unit to a bus for transfer of data between the central processing unit and memory system. The memory system includes a plurality of memory controllers, each of which controls the operation of a number of memory modules. Each controller also includes reconfiguration apparatus for enabling reconfiguration of the memory system upon detection of a fault. The reconfiguration apparatus includes apparatus for identifying the type and design revision of the controller associated therewith enabling more expeditious fault diagnosis based upon status signals provided by the controller during diagnostic testing by the central processing unit.

41 Claims, 14 Drawing Figures

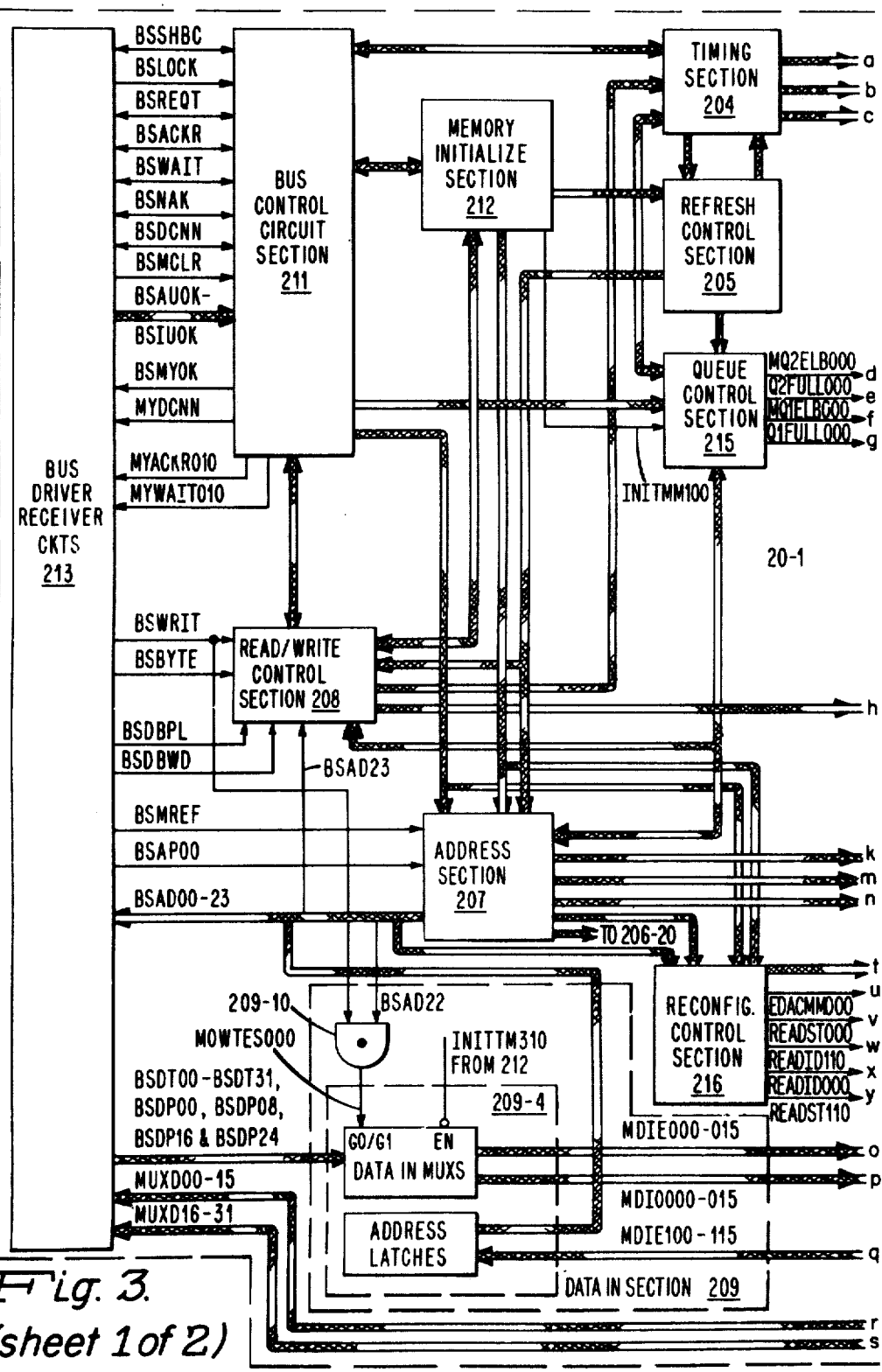
Fig. 3. (sheet 1 of 2)

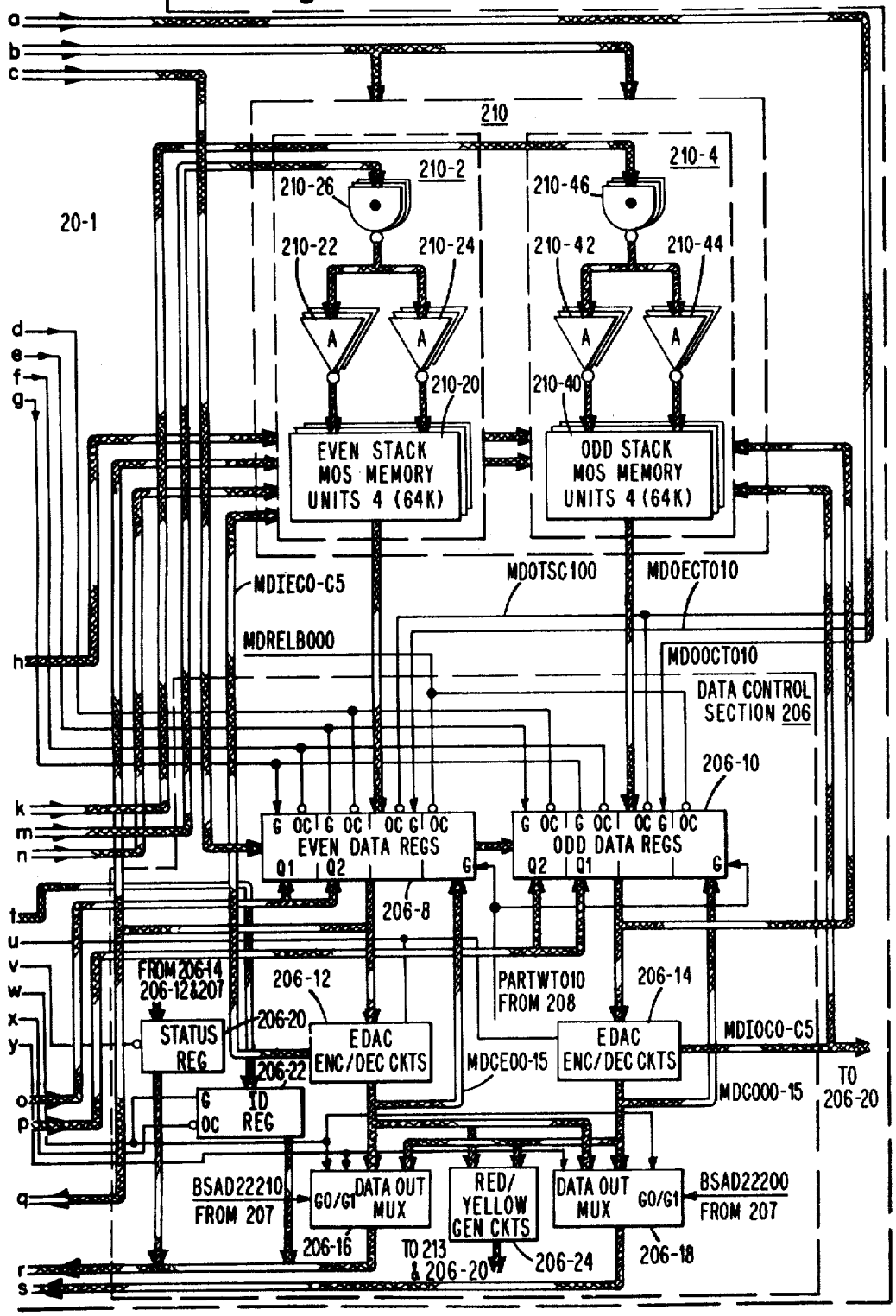

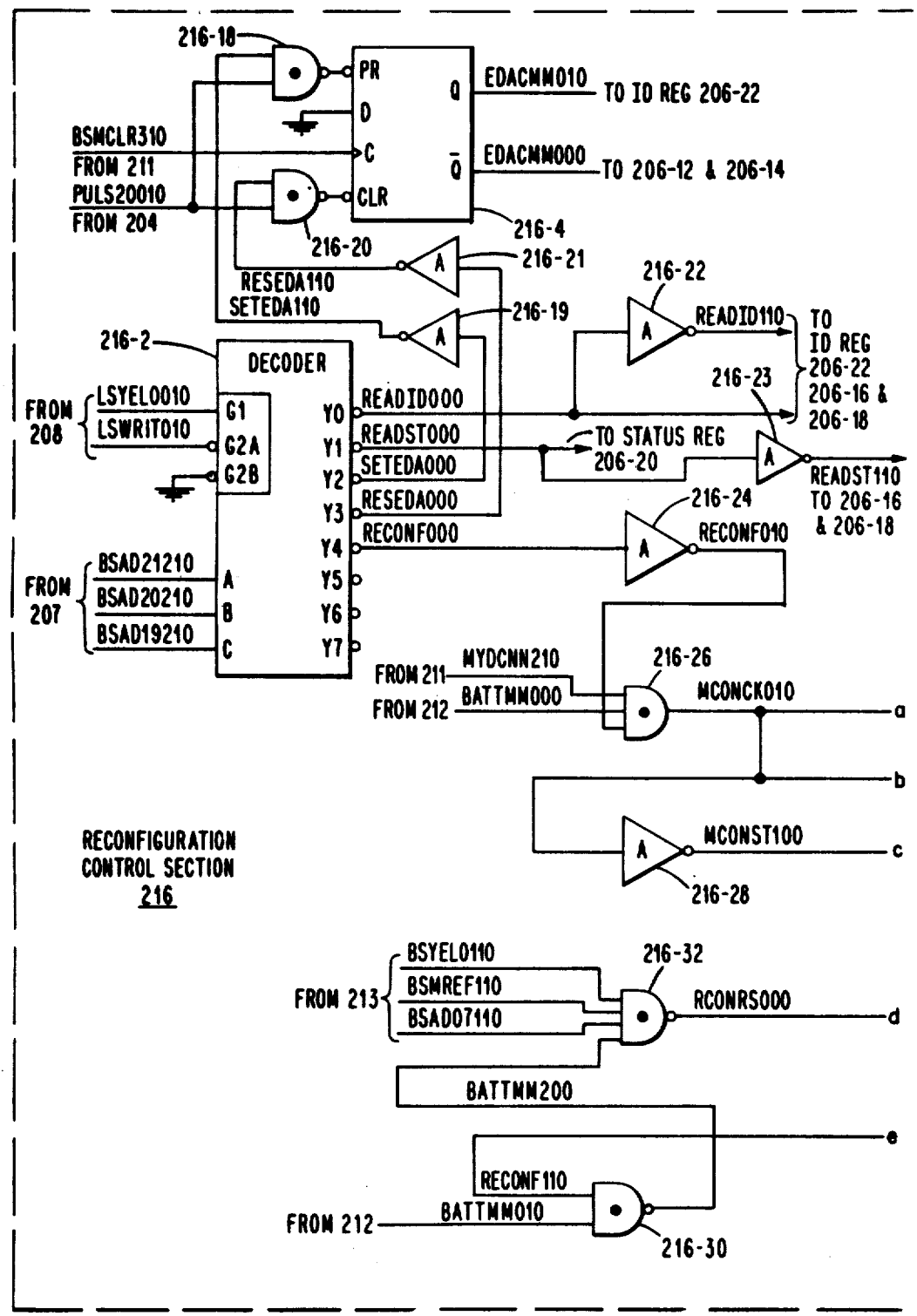
Fig. 4a. (sheet 1 of 4)

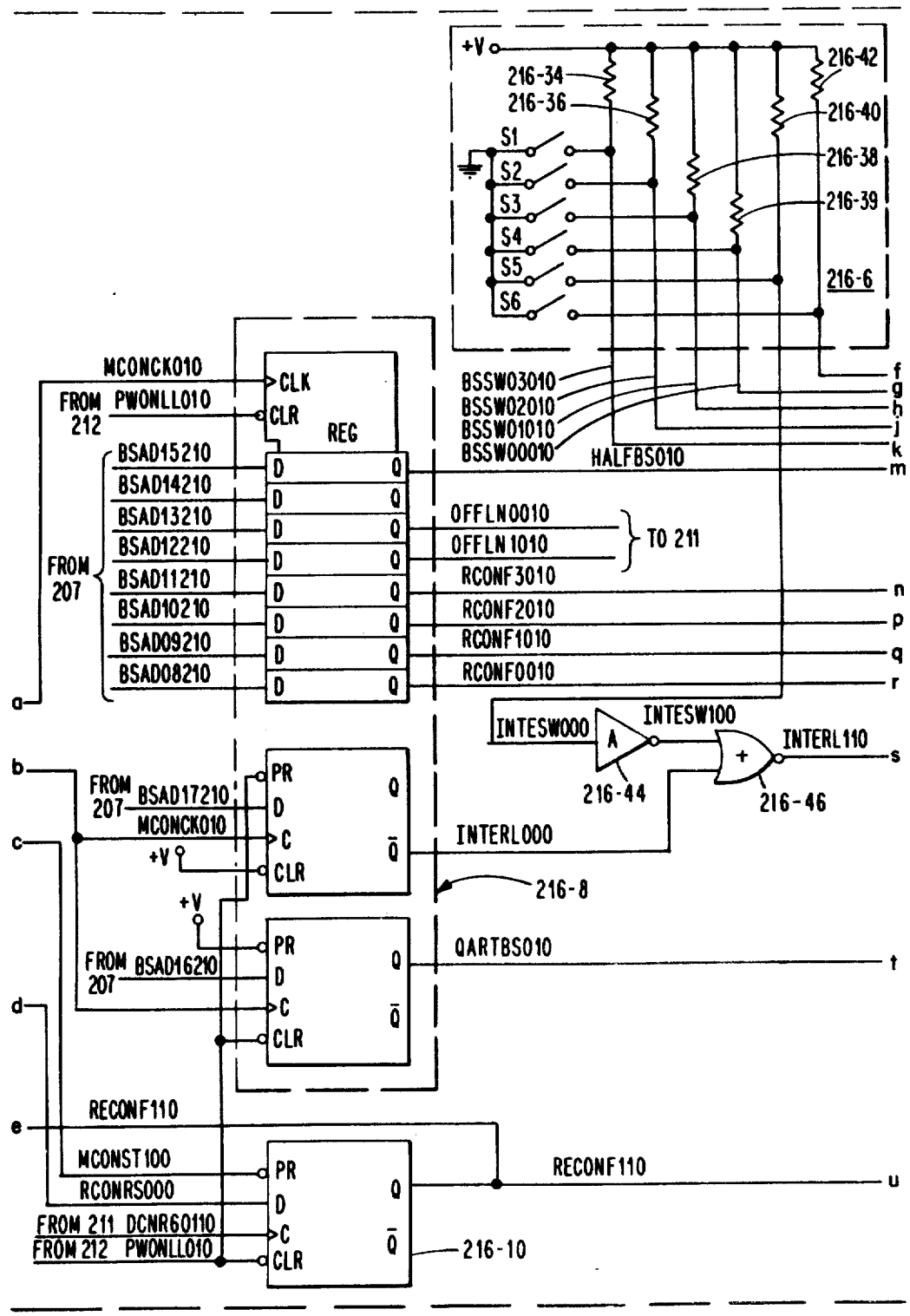
Fig. 4a. (sheet 2 of 4)

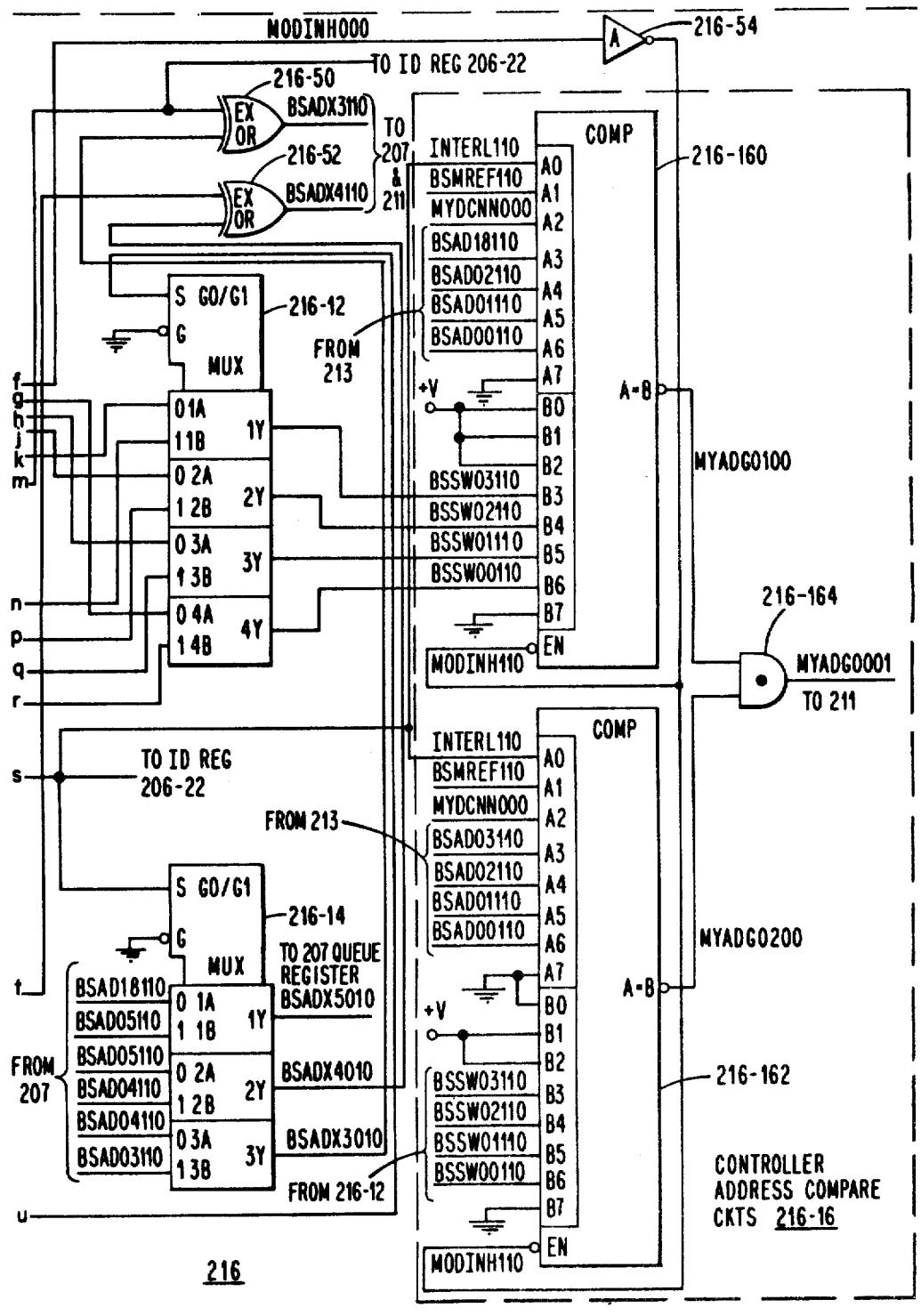
Fig. 4a. (sheet 3 of 4)

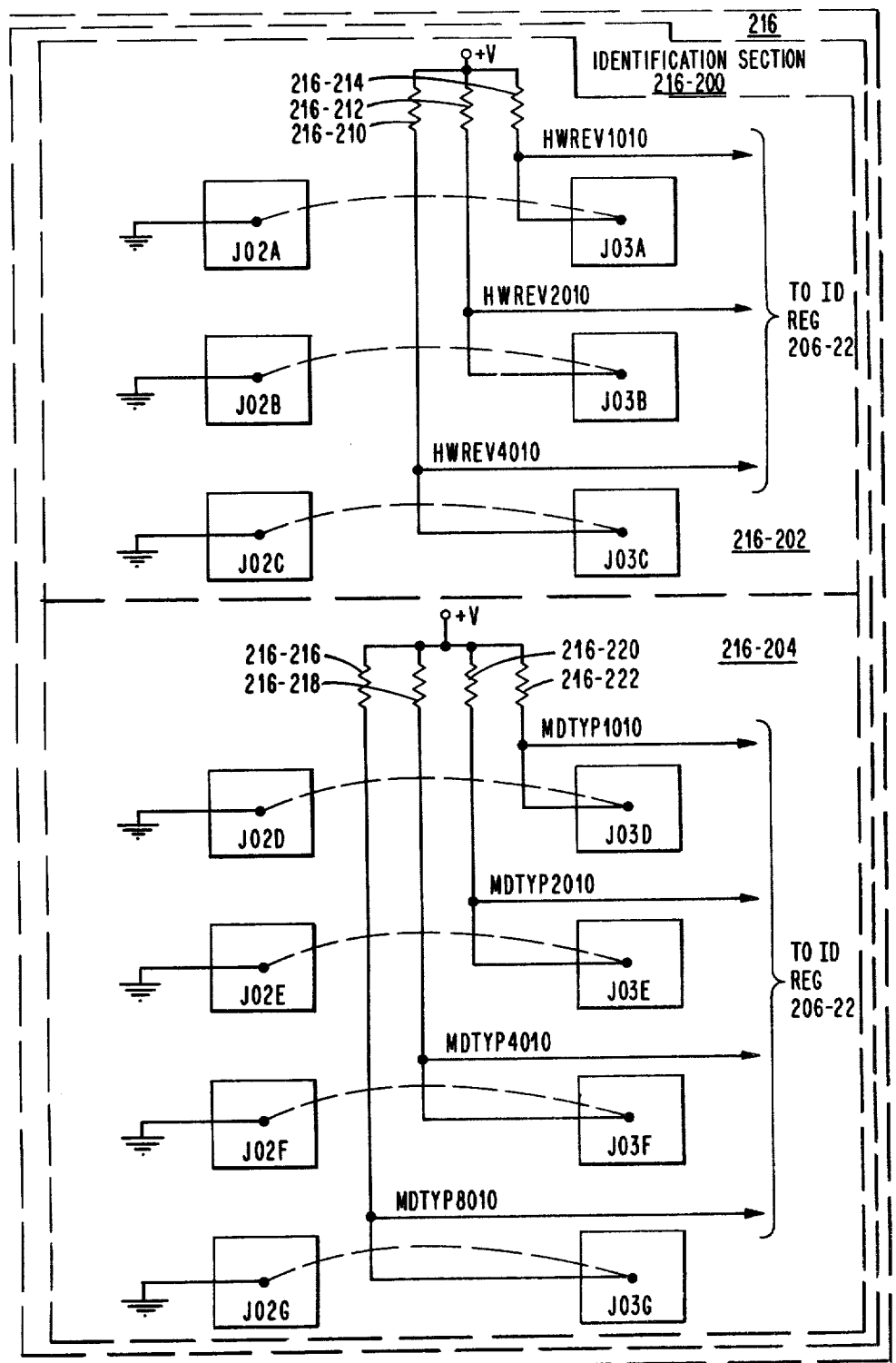
Fig. 4a. (sheet 4 of 4)

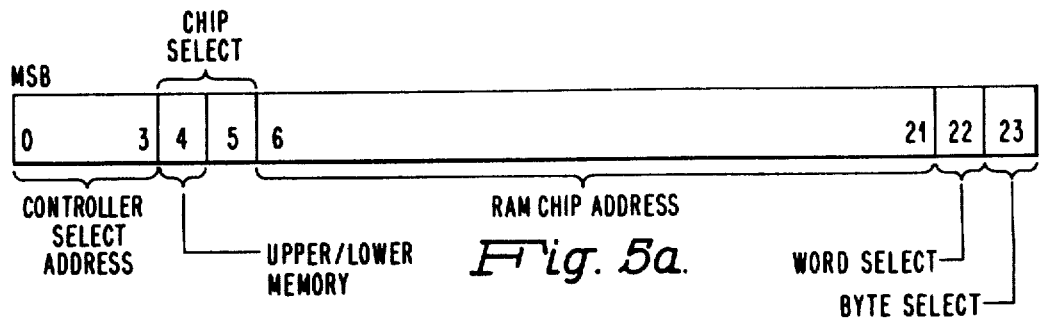
*Fig. 5a.*
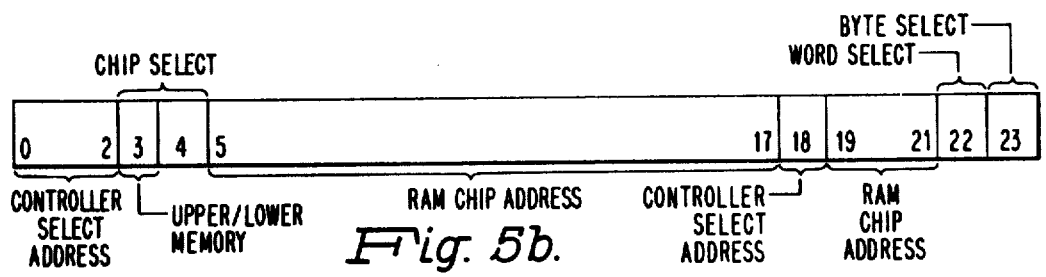
*Fig. 5b.*
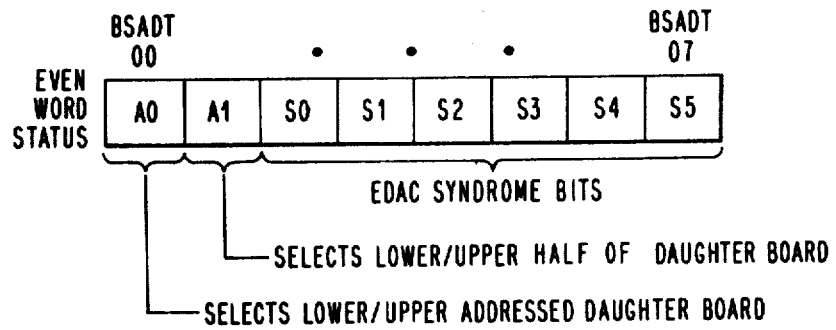
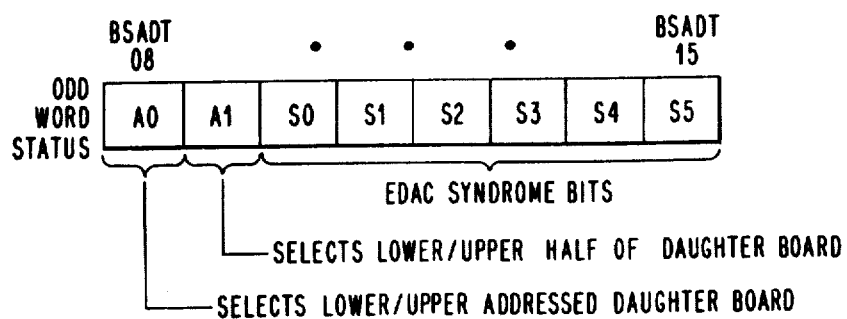
*Fig. 6a.*

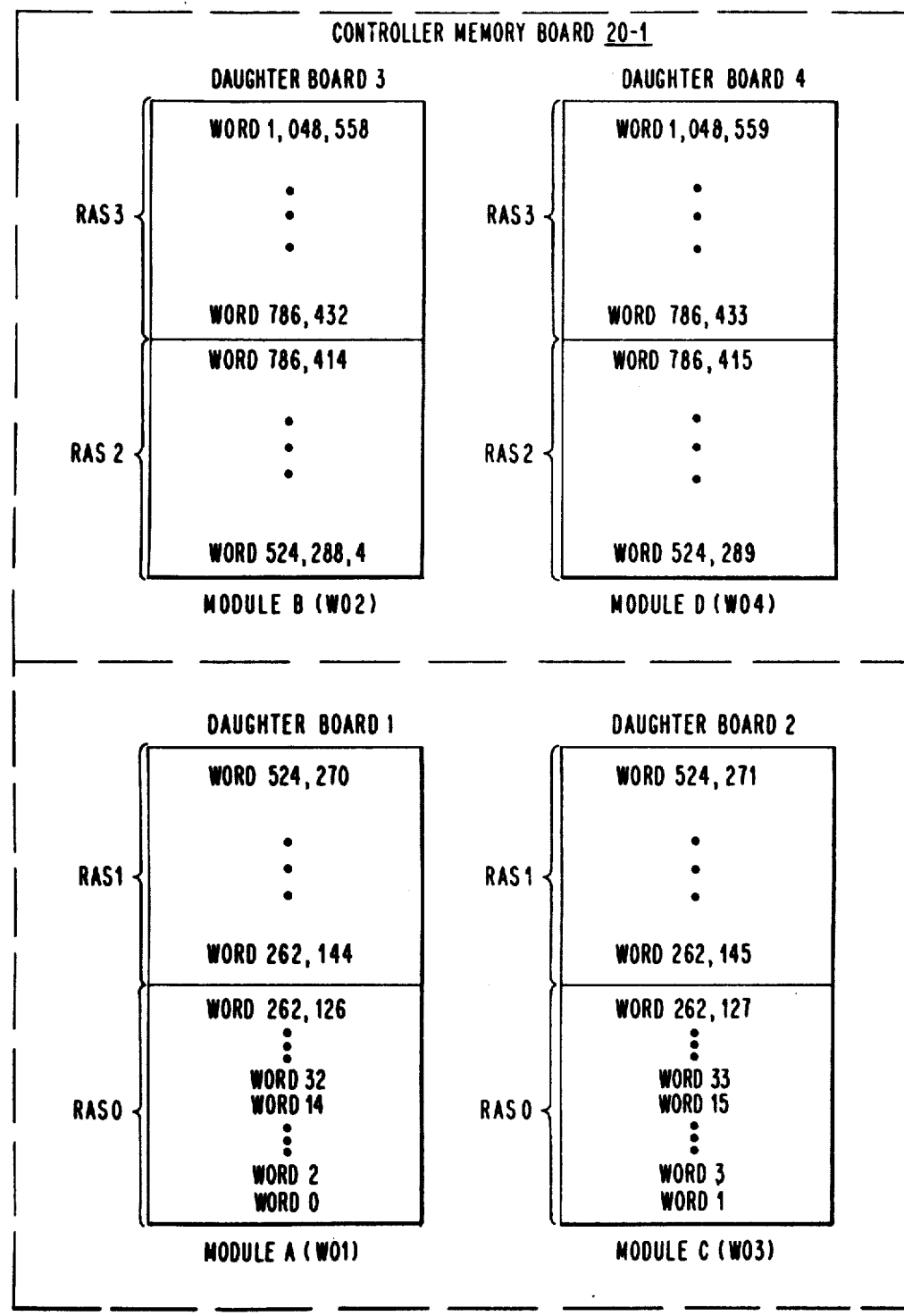
Fig. 6b. (sheet 1 of 2)

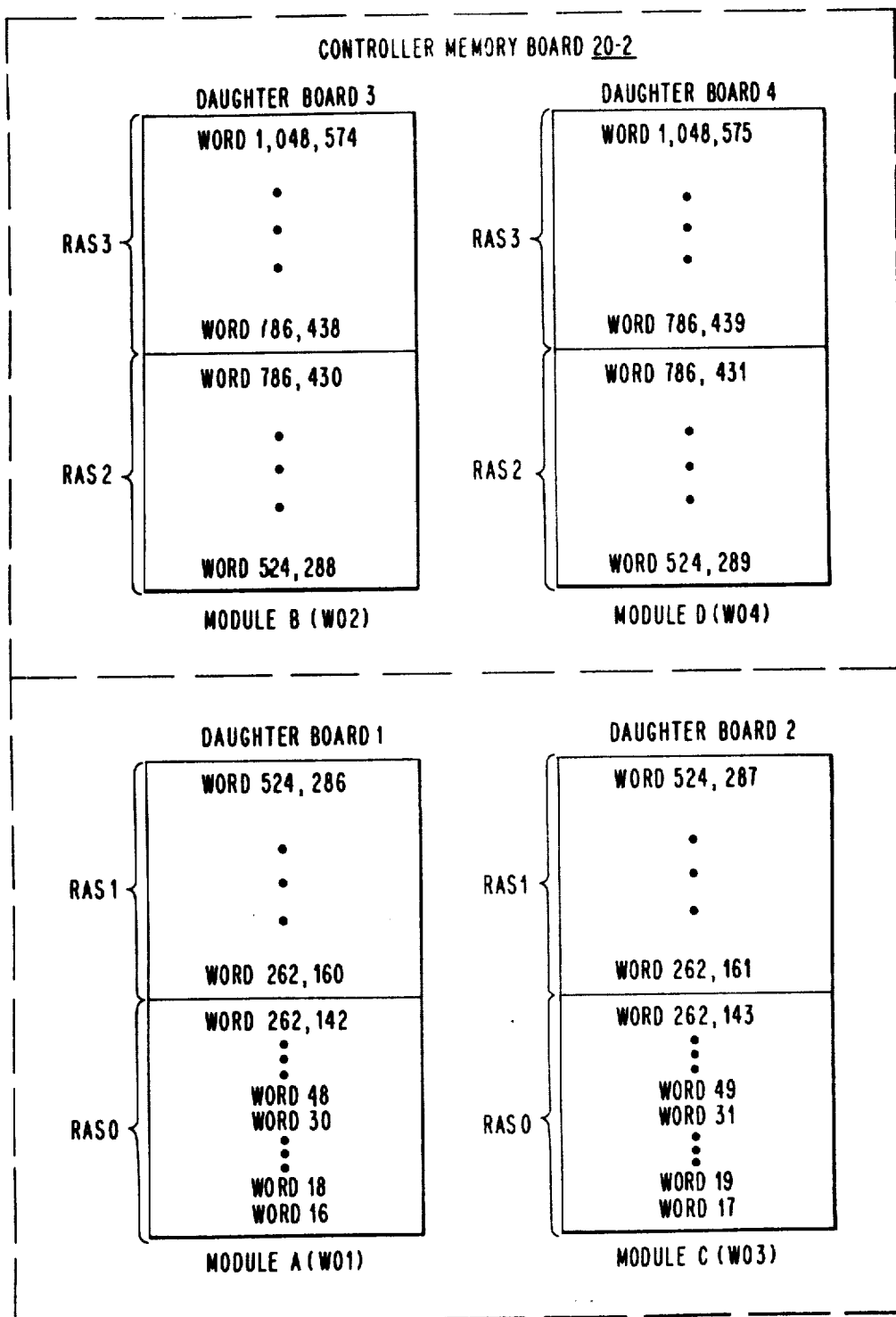
Fig. 6b. (sheet 2 of 2)

IDENTIFICATION APPARATUS FOR USE IN A CONTROLLER TO FACILITATE THE DIAGNOSIS OF FAULTS

RELATED PATENT APPLICATIONS

1. "A Memory System with Automatic Memory Reconfiguration" invented by Robert B. Johnson, Chester M. Nibby, Jr. and Edward R. Salas, Ser. No. 307,542, filed Oct. 1, 1981, now abandoned, which forms the basis of a continuation-in-part application, Ser. No. 413,631, filed Sept. 3, 1982 and assigned to the same assignee as named herein.

BACKGROUND OF THE INVENTION

1. Field of Use

The present invention relates to diagnostic testing and more particularly to apparatus for facilitating the location of a source of faults within a storage controller of a data processing system.

2. Prior Art

In general, numerous methods and techniques have been employed for performing computer maintenance. The main motivation for increased automation in this area is to minimize system down time so as to maximize the system's availability to the user or customer.

In many instances, the system down time is a function of the number and types of maintenance aids available to maintenance personnel. In the past, these aids normally included special maintenance switches and indicators which enable maintenance personnel to manually troubleshoot the computer system. It has been found that the results of manual diagnosis of faults vary very significantly because of dependence upon the ability and knowledge level of the maintenance personnel.

Due to the steady increase in complexity of computer systems, reliance on manual troubleshooting has been reduced significantly. In general, such troubleshooting has been largely replaced by diagnostic software. For example, diagnostic software is written to test the particular units of the system and indicate when such units are not being performed properly. In fact, families of diagnostic programs with error location abilities are normally used for carrying out the testing of even a single unit.

As system designs are upgraded and changed to correct design deficiencies, diagnosis of system errors becomes more difficult. Diagnosis is further complicated when different versions of the same unit are included within a system. For example, a single system may include several memory controllers, each of which may be of a different design or includes different capabilities.

Accordingly, different families of diagnostic programs have been created for testing each different version of controller design. Further, it became the task of the maintenance personnel to select among the families of diagnostic programs for carrying out the troubleshooting process. This can prove time consuming and result in increased system down time. Moreover, it may not be possible in some cases to determine the version of controllers located at a particular site due to board swaps and system upgrades.

Accordingly, it is a primary object of the present invention to provide apparatus for facilitating the diagnosis of system errors.

When further changes or modifications are made to a controller design, normally a new family of diagnostic programs are created for accommodating the controller design. This, in turn, increases the complexity and amount of diagnostic software which must be available for system testing.

It is a further object of the present invention to provide improved controller apparatus for reducing the amount of time in diagnostic errors within a controller.

SUMMARY OF THE INVENTION

The above objects are accomplished in accordance with the teachings of the present invention by including within a controller, apparatus for identifying the controller type and hardware revision. This identification information is presented on the common bus for transfer to a central processing unit to which the controller couples when a predetermined type of diagnostic command is issued to the controller by the central processing unit.

According to a preferred embodiment of the present invention, the controller is a memory controller which contains reconfiguration apparatus which corresponds to that disclosed in the copending patent application titled "A Memory System with Automatic Memory Reconfiguration" invented by Robert B. Johnson, Chester M. Nibby, Jr. and Edward R. Salas, bearing Ser. No. 307,542, filed on Oct. 1, 1981 and assigned to the same assignee as named herein.

In the preferred embodiment, the identification apparatus is included as part of such reconfiguration apparatus. The identification apparatus includes first circuit means and second circuit means, each having a plurality of input and output terminals. The input terminals of the first circuit means are selectively prewired for generating a first multibit binary code at the output terminals preassigned for designating the type of memory controller associated therewith. The input terminals of the second circuit means are selectively prewired for generating a second multibit binary code at its output terminals preassigned for designating the hardware revision of the associated memory controller.

In accordance with the teachings of the invention, a preassigned all ZERO binary code is used in connection with the first circuit means for designating a first controller design which includes a given functionality or set of features. When the first controller design is changed to include new functionality such as a new error detection and correction scheme or a new feature such as a soft error rewrite control apparatus, the next sequential binary code is used for designating this second controller design. As new features are added which necessitate the development of a new artwork, another sequential binary code is assigned to that controller design. Depending upon the particular design, the first circuit means which is included as part of each controller is constructed (prewired at the factory) to generate the appropriate preassigned binary code for identifying the type of controller design in use.

Also, in accordance with the teachings of the present invention, a preassigned all ZERO binary code is used in connection with the second circuit means for designating an initial version of the first controller design which contains at the outset no hardware revisions. When certain inadequacies in the first design are introduced, the new version is assigned the next sequential binary code for designating that the new version is a first hardware revision of the first controller design. Depending upon the particular hardware revision, the second circuit means, which is located as part of each controller, is constructed to generate the appropriate preassigned binary code for identifying the controller hardware revision of the design in use.

The output terminals of the first and second means couple to predetermined stages of an identification register included as part of the identification apparatus of the present invention. This register couples to the output bus to which the controller associated therewith couples. Additionally, the apparatus of the present invention includes a status register for storing information indicating the operational or error status of various portions of the controller. In response to an error condition, the central processing unit operates to generate a number of memory commands, certain ones of which include a diagnostic code for specifying the read out of the identification register and status register contents by decode control circuits included as part of the reconfiguration apparatus. Thereafter, the central processing unit operates to utilize the identification information corresponding to the first and second multibit binary codes designating controller type and revision for selecting the diagnostic test and verification routines required for properly testing the particular controller having reported the error for locating the cause of faults therein. In this manner, the number and complexity of the diagnostic test and verification routines can be substantially reduced. For example, a number of diagnostic routines covering identical parts of different controller designs can be used for testing all such designs.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIG. 3 shows in block diagram form, the memory subsystem 20-1 of FIG. 1.

FIGS. 4a and 4b illustrate in greater detail different portions of the memory subsystem 20-1 of FIG. 3 which relate to the apparatus of the present invention.

FIG. 5a illustrates the format of the address applied to the controllers of FIG. 1 when the system is being operated in banked mode.

FIG. 5b illustrates the format of the address applied to the controllers of FIG. 1 when the system is being operated in interleaved mode.

FIG. 6a illustrates the format of the status word register contents applied to bus 10 by a controller in response to a read status word diagnostic command.

FIG. 6b illustrates the memory organization of a pair of controllers of FIG. 1.

GENERAL DESCRIPTION OF SYSTEM OF FIG. 1

Figure 1:
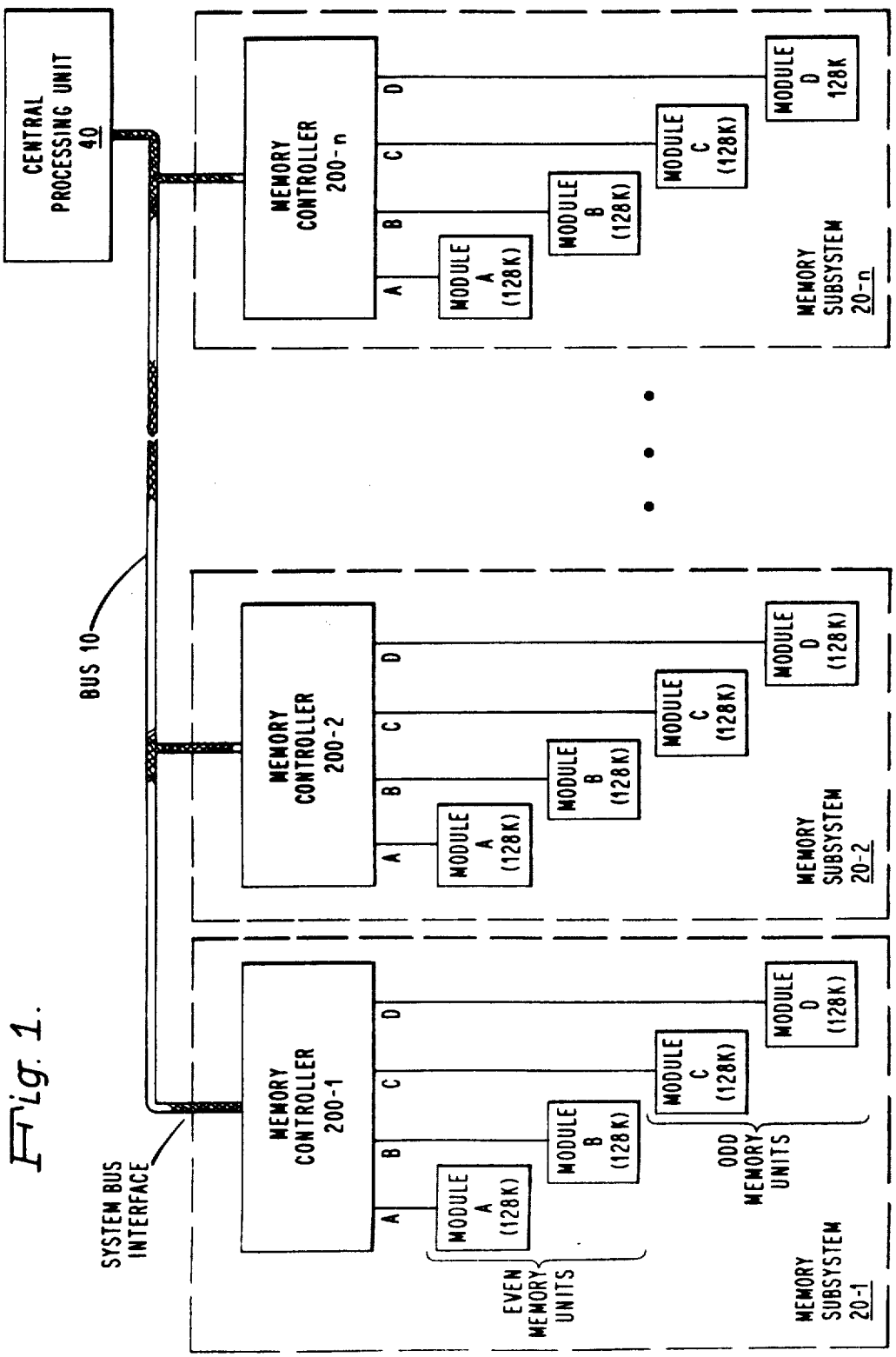
FIG. 1 shows in block diagram form a system which includes a memory system which incorporates the apparatus of the present invention.

FIG. 1 illustrates a data processing system which includes the apparatus of the present invention. Referring to FIG. 1, it is seen that the system includes a multiline bus 10 coupled to n number of memory subsystems 20-1 through 20-n and to a central processing unit (CPU) 40. While only memory controllers are shown, it will be appreciated that the system of FIG. 1 will normally include other units such as those disclosed in U.S. Pat. No. 4,000,485 issued Dec. 28, 1976. Each of the memory subsystems include a memory controller (i.e., 200-1 through 200-n) which address up to two pairs of four memory module units labeled A through D. As discussed herein, the circuits of each memory module unit is included on a daughter board which connects to a mother board containing the controller's control circuits. In the preferred embodiment, a memory controller is either fully populated (i.e., contains two pairs of daughter boards) or is half populated (i.e., contains one pair of daughter boards).

The CPU 40 is a microprogrammed processing unit which may for the purposes of the present invention may be considered conventional in design. The copending patent application cited above in addition to the patent application "System Providing Multiple Outstanding Information Requests", invented by Richard A. Lemay and John L. Curley, issued as U.S. Pat. No. 4,181,974 on Jan. 1, 1980 and assigned to the same assignee as named herein may be consulted for further details. Also, the related patent application of George J. Barlow, et al., titled "Interface for Controlling Information Transfers between Main Data Processing Systems Units and a Central Subsystem" referenced herein may also be consulted.

Figure 2:
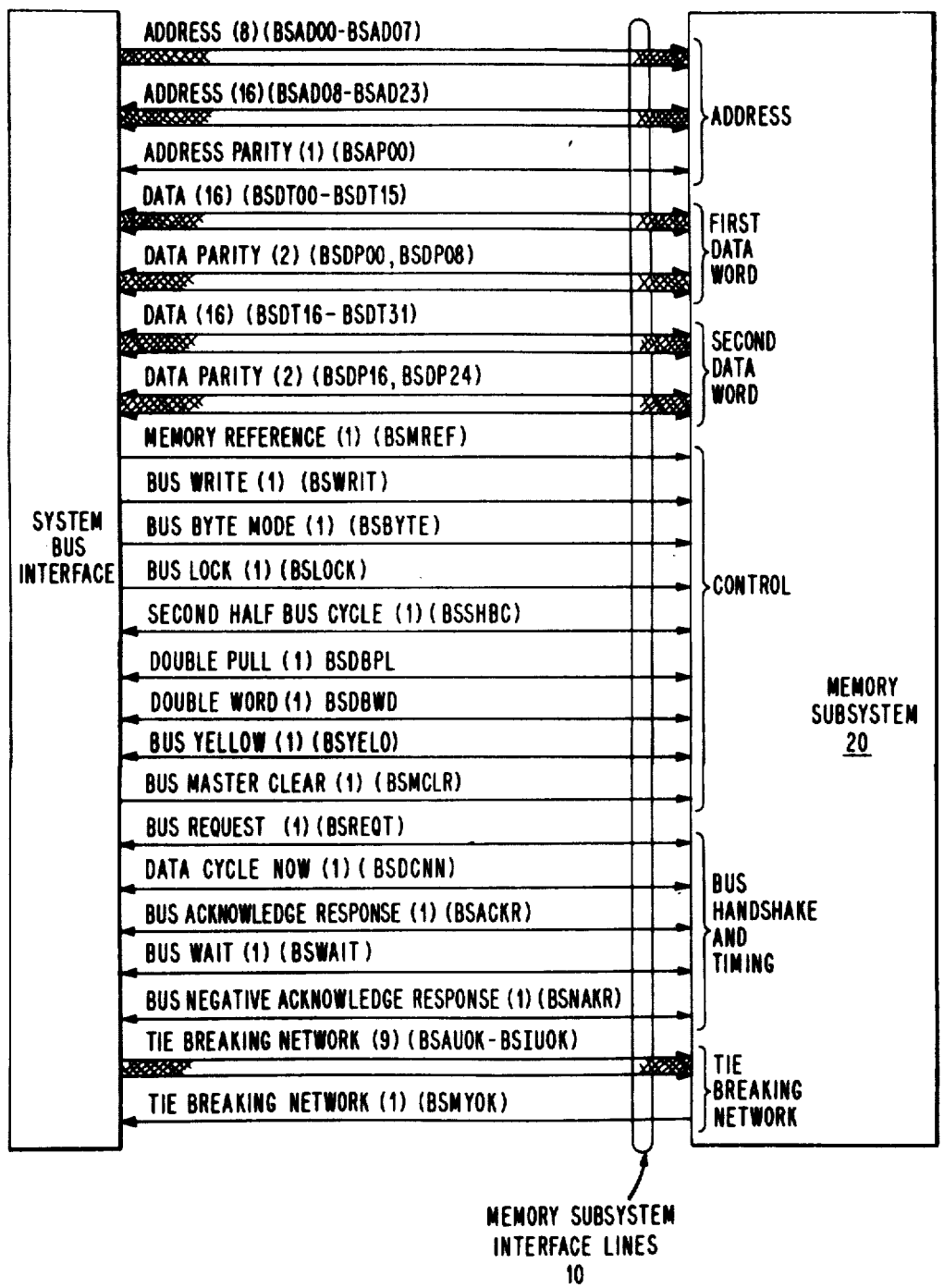
FIG. 2 shows in detail the lines of the system bus 10 which connect to each of the memory subsystems of FIG. 1.

The CPU 40 as well as each controller and each memory subsystem communicates over the bus 10 in a predetermined manner as set forth in U.S. Pat. No. 4,000,485. Briefly, a unit wishing to communicate requests a bus cycle and when the bus cycle is granted, the unit becomes the "master" and is able to address any other unit in the system as the "slave". In the cases of those bus exchanges which require a response (e.g. memory read operation), the requesting unit as "master" identifies itself and indicates to the "slave" unit that a response is required. When the slave is ready to respond (e.g. obtains the information requested), it assumes the role of "master" and initiates the transfer of information to the requesting unit. Thus, the number of bus cycles vary depending upon the type of operation being performed. By altering the states of the signals applied to the control lines discussed in connection with FIG. 2, a unit is able to designate to the other unit, the type of cycle of operation being initiated or performed.

A distributed tie-breaking network grants bus cycles and resolves simultaneous requests for use of bus 10. Priority is granted on the basis of physical position on bus 10, the highest priority being given to the first unit on the bus. In a typical system, the memory subsystem is granted the highest priority and the CPU is granted the lowest priority with the other units being positioned on the basis of their performance requirements.

MEMORY SUBSYSTEM INTERFACE

Before describing the controller of FIG. 1, it is seem that there are a number of lines which constitute the interface between each controller and bus 10. As shown, the interface lines include a number of address lines (BSAD00-23, BSAP00), two sets of data lines (BSDT00-15, BSDP00, BSDP08) and (BSDT16-31, BSDP16, BSDP24), a number of control lines (BSMREF-BSMCLR), a number of timing lines (BSREQT-BSNAKR), and a number of tie breaking network lines (BSAUOK-BSIUOK, BSMYOK).

The description of the above interface lines are given in greater detail in the section to follow.

| MEMORY SUBSYSTEM INTERFACE LINES | |
|---|---|
| Designation | Description |
| | Address Lines |
| BSAD00-BSAD23 | The bus address lines constitute a twenty-four bit wide path used in conjunction with the bus memory reference line BSMREF to transfer a 24-bit address to controller 200 or a 16-bit identifier from controller 200 to the bus (for receipt by a slave unit). When used for memory addressing, the signals applied to lines BSAD00-BSAD03 select a particular 512K word module, the signals applied to lines BSAD04-BSAD22 select one of the 512K words in the module while the signal applied to line BSAD23 selects one of the bytes within the selected word (i.e., BSAD23 = 1 = right byte; BSAD23 = 0 = left byte). When used for identification, lines BSAD00-BSAD07 are not used. The lines BSAD08-BSAD23 carry the identification of the receiving unit as transmitted to controller 200 during the previous memory read request. |
| BSAP00 | The bus address parity line is a bidirectional line which provides an odd parity signal for the address signals applied to lines BSAD00-BSAD07. |
| | Data Lines |
| BSDT00-BSDT15, BSDT16-BSDT31 | The sets of bus data lines constitute a 32-bit or two word wide bidirectional path for transferring data or identification information between controller 200 and the bus as a function of the cycle of operation being performed. During a write cycle of operation, the bus data lines transfer information to be written into memory at the location specified by the address signals applied to lines BSAD00-BSAD23. During the first half of a read cycle of operation, the data lines BSDT00-BSDT15 transfer identification information (channel number) to the controller 200. During the second half of the read cycle, the data lines transfer the information read from memory. |
| BSDP00, BSDP08, BSDP16, BSDP24 | The bus data parity lines are two sets of bidirectional lines which provide odd parity signals coded as follows: BSDP00=odd parity for signals applied to lines BSDT00-BSDT07 (left byte); BSDP08=odd parity for signals applied to lines BSDT08-BSDT15 (right byte); BSDP16=odd parity for signals applied to lines BSDT16-BSDT23; and BSDP24=odd parity signals applied to lines BSDT24-BSDT31. |
| | Control Lines |
| BSMREF | The bus memory reference line extends from the bus to the memory controller 200. When set to a true state, this line signals the controller 200 that the lines BSAD00-BSAD23 contain a complete memory controller address and that it is performing a write or read operation upon the specified location. When reset to a false state, the line signals controller 200 that the lines BSAD00-BSAD23 contain information directed to another unit and not controller 200. |
| BSWRIT | The bus write line extends from the bus to the memory controller 200. This line when set to a true state, in conjunction with line BSMREF being true, signals controller 200 to perform a write cycle of operation. When reset to a false state, this line, in conjunction with line BSMREF being true, signals controller 200 to perform a read cycle of operation. |
| BSBYTE | The bus byte line extends from the bus to controller 200. This line, when set to a true state, signals controller 200 that it is to perform a byte operation rather than a word operation. |
| BSLOCK | The bus lock line extends from the bus to controller 200. When set to a true state, this line signals controller 200 of a request to perform a test or change the status of a memory lock flip-flop included within the controller 200. |
| BSSHBC | The bus second half bus cycle line is used to signal a unit that the current information applied to the bus by controller 200 is the information requested by a previous read request. In this case, both controller 200 and the unit receiving the information are busy to all units from the start of the initiation cycle until controller 200 completes the transfer. This line is used in conjunction with the BSLOCK line to set or reset its memory lock flip-flop. When a unit is requesting to read or write and line BSLOCK is true, the line BSSHBC, when true, signals controller 200 to reset its lock flip-flop. When in a false state, it signals controller 200 to test and set its lock flip-flop. |
| BSMCLR | The bus master clear line extends from the bus to controller 200. When this line is set to a true state, it causes the controller 200 to clear to zeros certain bus circuits within controller 200. |
| BSDBWD | The double word line is a bidirectional line which extends from the controller 200 to bus 10. This line together with the BSDBPL line is used during read requests to indicate how many words of data and in what format are being provided by memory controller 200. During read response cycles from memory controller 200, the state of line BSDBWD indicates whether one or two words of data are being applied to bus 10. When line BSDBWD is forced to a binary ONE state, this indicates that two words are being transferred. When only one word is being transferred, line BSDBWD is forced to |

MEMORY SUBSYSTEM INTERFACE LINES

| Designation | Description |
|---|---|
| BSDBPL | a binary ZERO. The double pull line is a bidirectional line which extends between controller 200 and bus 10. This line together with line BSDBWB indicates whether the response is the first (not the last) or the last unit of data requested. |

Bus Handshake/Timing Lines

| Designation | Description |
|---|---|
| BSREQT | The bus request line is a bidirectional line which extends between the bus and controller 200. When set to a true state, it signals the controller 200 that another unit is requesting a bus cycle. When reset to a false state, it signals controller 200 that there is no bus pending bus request. This line is forced to a true state by controller 200 to request a read second half bus cycle. |
| BSDCNN | The data cycle line is a bidirectional line which extends between the bus and controller 200. When forced to a true state, the line signals the controller 200 that a unit was granted a requested bus cycle and placed information on the bus for another unit. The controller 200 forces the line to a true state to signal that it is transmitting requested data back to a unit. Prior to this, controller 200 had requested and been granted a bus cycle. |
| BSACKR | The bus acknowledge line is a bidirectional line which extends between the bus and controller 200. When set to a binary ONE by controller 200, the line signals that it is accepting a bus transfer during a read first half bus cycle or write cycle. During a read second half bus cycle, this line when set to a binary ONE by the unit which originated the request signals the controller 200 of its acceptance of a transfer. |
| BSWAIT | The bus wait line is a bidirectional line which extends between the bus and controller 200. When set to a true or binary ONE state by controller 200, it signals a requesting unit that the controller cannot accept a transfer at this time. Thereafter, the unit will initiate successive retries until the controller 200 acknowledges the transfer. The controller 200 sets the BSWAIT line true under the following conditions:<br>1. It is busy when all queue registers are full.<br>2. It is busy when placed in an initialize mode.<br>When the BSWAIT line is set to a true or binary ONE state by a unit, this signals the controller 200 that the data is not being accepted by the requesting unit and to terminate its present bus cycle of operation. |
| BSNAKR | The bus negative acknowledge line is a bidirectional line which extends between the bus and controller 200. When this line is set to a true or binary ONE state by controller 200, it signals that is is refusing a specified transfer. The controller 200 sets line BSNAKR to a true state as follows:<br>1. Memory lock flip-flop is set to a binary ONE, and<br>2. The request is to test and set the lock flip-flop (BSLOCK true and BSSHBC false).<br>In all other cases, when the memory lock flip-flop is set, controller 200 generates a response via the BSACKR line or the BSWAIT line or generates no response.<br>When the BSNAKR line is forced true by a unit, this signals controller 200 that the data is not accepted by the unit and to terminate its cycle of operation. |

Tie Breaking Control Lines

| Designation | Description |
|---|---|
| BSAUOK-BSIUOK | The tie breaking network lines extend from the bus to controller 200. These lines signal controller 200 whether units of higher priority have made bus requests. When all the signals on these lines are binary ONES, this signals controller 200 that it has been granted a bus cycle at which time it is able to force the BSDCNN line to a binary ONE. When any one of the signals on the lines is a binary ZERO, this signals controller 200 that it has not been granted a bus cycle and is inhibited from forcing line BSDCNN to a binary ONE. |
| BSMYOK | The tie breaking network line extends from controller 200 to the bus. Controller 200 forces this line to a false or binary ZERO state to signal other units of lower priority of a bus request. |
| BSYELO | The bus yellow line is a bidirectional line. When set to a true state during the second half of a bus cycle in response to a read command, it indicates that the accompanied transferred information has been successfully corrected.<br>When set to a true state during a memory read request, this line indicates that the read request is to be interpreted as a diagnostic command. |

GENERAL DESCRIPTION OF THE MEMORY SUBSYSTEM OF FIG. 1

FIG. 3 shows a preferred embodiment of a memory subsystem 20-1 including a controller 200-1 which is constructed using the principles of the present invention. Referring to FIG. 3, it is seen that the controller 200-1 controls the two 256K word memory module units 210-2 and 210-4 of memory section 210. The module units of blocks 210-2 and 210-4 include high speed MOS random access memory integrated circuits corresponding to blocks 210-20 and 210-40, and address buffer circuits corresponding to blocks 210-22 through 210-26 and 210-42 through 210-46. Each 256K memory unit is constructed from 64K word by 1-bit dynamic MOS RAM chips illustrated in greater detail in FIG. 6b. More specifically, referring to FIG. 6b, it is seen that each 256K by 22-bit memory module includes 88, 65,534 (64K) word by 1-bit chips. Within each chip there are a number of storage arrays organized in a matrix of 256 rows by 256 columns of storage cells.

The controller 200-1 includes those circuits required to generate memory timing signals, perform refresh operations, control operations, data transfer operations, address distribution and decoding operations and bus interface operations. Such circuits are included as part of the different sections of FIG. 3.

The sections include a timing section 204, a refresh control section 205, a data control section 206, an address section 207, a read/write control section 208, a data in section 209, a bus control circuit section 211, a memory initialize circuit section 212, a bus driver/receiver circuit section 213 and a reconfiguration control section 216.

The bus control section 211 includes the logic circuits which generate signals for generating and accepting bus cycle requests for single and double word operations. As seen from FIG. 3, these circuits as well as the circuits of the other sections are connected to the bus via the driver/receiver circuits of section 213 which are conventional in design. The section 211 includes the tie breaking network circuits which resolve request priority on the basis of a unit's physical position on the bus. The memory controller 200-1 of FIG. 1, located at the left most or bottom position of bus 10, is assigned the highest priority while a central processing unit (CPU) 40, located at the highest most or top position of the bus is assigned the lowest priority. For further information regarding bus operation, reference may be made to U.S. Pat. No. 4,000,485 which issued Dec. 28, 1976.

The timing section 204 includes circuits which generate the required sequence of timing signals from memory read and write cycles of operation. As seen from FIG. 3, this section transmits and/or receives signals to and from sections 205, 206, 207, 208, 211, 213 and 215.

The address section 207 includes circuits which decode, generate and distribute address signals required for refresh operations, initialization and read/write selection. The section 207 receives address signals from lines BSAD00-BSAD23 and BSAP00 in addition to the memory reference control signal from the BSMREF line. Additionally, section 207 receives control and timing signals from sections 204, 205, 212 and 215.

The memory initialization section 212 includes circuits, conventional in design, for clearing the controller circuits to initial or predetermined state.

The read/write control section 208 includes register and control logic circuits, conventional in design. The register circuits receive and store signals corresponding to the states of the BSWRIT, BSBYTE, BSDBPL, BSDBWD and BSAD23 lines. The control circuits decode the signals from the register circuits and generate signals which are applied to sections 204, 207 and 210 for establishing whether the controller is to perform the read, write or read followed by a write cycle of operation (i.e., for a byte command).

The refresh section 205 includes the circuits for periodically refreshing the contents of the memory. Section 205 receives timing and control signals from section 204 and provides refresh command control signals to sections 204, 207, 208, and 212. For further details, reference may be made to U.S. Pat. No. 4,185,323 which discloses circuits for generating refresh comman (REFCOM) signals.

The data in section 209 circuits of block 209-4 include a pair of multiplexer circuits and an address register which is connected to receive signals from section 206. The multiplexer circuits, conventional in design, receive data words from the two sets of bus lines BSDT00-15 and BSDT16-31 and apply the appropriate words via the sets of output lines MDIE000-015 and MDIO000-015 to the correct memory modules during a write cycle of operation. That is, multiplexer circuits are selectively enabled by signal MOWTES000 generated by an AND gate 209-10 when initialize signal INITTM310 from 212 is a binary ZERO (i.e., not in an initialize mode). The AND gate 209-10 generates signal MOWTES000 as a function of bus address bit 22 (i.e., signal BSAD22) and whether the controller is doing a write operation (i.e., signal BSWRIT). During a write operation, signal MOWTES000 selects the correct data word (i.e., the word applied to bus lines BSDT00-15 or BSDT16-31) to be applied to the correct memory unit. This enables a write operation to start on any word boundary.

During a read operation, the multiplexer circuits are conditioned to apply the module identification information received from the bus lines BSDT00-15 back to the address bus lines BSAD08-23. This is done by loading the signals applied to lines BSDT00-15 into the even data registers 206-8 of section 206. This, in turn, causes the address register latches of block 209-4 to be with the module identification information transmitted via the bus lines BSDT00-15. Since this is not pertinent to an understanding of the present invention, it will not be further discussed herein.

The data control section 206 includes two sets of tristate operated data registers 206-8 and 206-10, multiplexer circuits 206-16 and 206-18 with associated control circuits which enable data to be written into and/or read from the even and odd memory units 210-20 and 210-40 of section 210. For example, during a double wide read cycle of operation, operand or instruction signals are read out from the units 210-20 and 210-40 into the even and odd output registers 206-8 and 206-10. During a write cycle of operation, signals MDIE000-15 and MDIO000-15 are loaded into the left most section of the pair of registers 206-8 and 206-10 from the bus via section 209-4 and written into the odd or even unit of section 210.

In accordance with the teachings of the present invention, section 206 further includes a status register 206-20 and an identification register 206-22. The status register 206-20 is connected to store memory error information used for isolating memory faults. For example, the register stores combinations of address bits from section 207 and EDAC syndrome bits from EDAC circuits 206-12 and 206-14 required for isolation of faults down to the RAM chip in the case of correctable single bit errors. The status register 206-20 contains status information pertaining to the most recent single bit error and its contents remain frozen in the case of uncorrectable double bit errors.

The identification register 206-22 of the present invention is connected to store signals received from reconfiguration control section 216 identifying the type and hardware revision of the controller design as well as the reconfiguration and mode of operation. Additionally, section 206 includes the red and yellow generator circuits of block 206-24. These circuits generate signals indicating whether the information being transferred to bus 10 is in error and whether or not the error is correctable. The yellow generator circuits force a signal applied to line BSYELO to a binary ONE for indicating that the accompanying transferred information is correct but that a correction operation was performed (i.e., a hard or soft error condition). The red generator circuits force another signal to a binary ONE for indicating that the accompanying transferred information is in error (i.e., an uncorrectable error condition). These signals are applied to other bus lines, not shown. For further details concerning the generation of these signals, reference may be made to U.S. Pat. No. 4,072,853.

The controller 200-1 includes error detection and correction (EDAC) apparatus wherein each word contains 16 data bits and 6 check bits used to detect and correct single bit errors in the data words and detect and signal without correction, double bit errors in the data word. The EDAC apparatus includes two sets of EDAC encoder/decoder circuits 206-12 and 206-14. These circuits may take the form of those circuits disclosed in U.S. Pat. No. 4,072,853 which issued Feb. 7, 1978. Additionally, the section 206 enables a return of identification information received from the data lines BSDT00-15 and stored in register 209-4 via the address lins BSAD08-23.

For completeness, queue control section 215 has also been included as part of controller 200-1. This section includes circuits for storing address and control information for concurrently processing a plurality of memory requests. As seen from FIG. 3, section 215 receives control signals from sections 204, 205, 207, 211 and 212. The section provides control signals to sections 204, 206, 207 and 208, as shown. Since the operation of this section is not pertinent to an understanding of the present invention, it will not be disclosed in greater detail herein.

In accordance with the teachings of the present invention, reconfiguration control section 216 includes circuits for generating type and hardware revision binary coded signals identified with the particular controller associated therewith. As seen from FIG. 3, section 216 receives address and control signals from sections 207, 208, 211 and 212. Section 216 provides identification, control and status signals to sections 206, 207 and 211.

Pertinent portions of the above sections will now be discussed in greater detail with reference to FIGS. 4a and 4b.

DETAILED DESCRIPTION OF CONTROLLER SECTIONS

Only those sections which are believed necessary to an understanding of the present invention are described herein. For further information regarding the remaining sections, reference may be made to the related patent application or to U.S. Pat. No. 4,185,323.

Section 206

The even and odd data registers 206-8 and 206-10 are tristate operated. More specifically, the registers are constructed from D-type transparent latch circuits such as those designated SN74S373 manufactured by Texas Instruments Incorporated. The register circuits are transparent meaning that while the signal applied to the G input terminal is a binary ONE, the signals at the Q output terminals follow the signals applied to the D input terminals. That is, when the signal applied to the G input terminal goes low, the signal at Q output terminal latches.

The output terminals of registers 206-8 and 206-10 are connected in common in a wired OR arrangement for enabling the multiplexing of the pair of data word signals. Such multiplexing is accomplished by controlling the states of the signals MQ2ELB000, MQ1ELB000, MDOTSC000 and MDRELB000 applied to the output control (OC) input terminals of the different sections of registers 206-8 and 206-10 shown in FIG. 3. This operation is independent of the latching action of the register flip-flops which takes place in response to the signals applied to the G input terminals.

When signal MDOTSC100 generated by the circuits 204 is a binary ZERO, the middle sections of registers 206-8 and 206-10 are enabled to apply their contents to their output terminals. During a write cycle, the circuits 204 force signal MDOTSC100 to a binary ONE. This produces the opposite result to that described. That is, signal MDOTSC100 inhibits the middle sections of registers 206-8 and 206-10 from applying their contents to their output terminals.

The left most sections of registers 206-8 and 206-10 are enabled to apply their contents to their output terminals when signal MDRELB000 is a binary ZERO. Signal MDRELB000 for the purposes of the present invention can be considered to be in a binary ONE state. Thus, the right most sections of the registers are inhibited from applying their contents to their output terminals.

The left two most sections of registers 206-8 and 206-10 are controlled by the states of signals MQ1ELB000 and MQ2ELB000 which are generated by section 215. Signal MDOTSC000 when a binary ZERO enables one of the two left most sections of either register 206-8 or 206-10 as a function of the states of signals Q1TRST010 and Q2TRST000 from section 215. When signal Q1TRST010 is a binary ONE, signal Q2TRST000 is a binary ZERO and section 215 forces signal MQ1ELB000 to a binary ZERO. This enables the Q1 section of registers 206-8 and 206-10 to apply their contents to their output terminals. Conversely when signal Q1TRST010 is a binary ZERO, signal Q2TRST000 is a binary ONE and section 215 forces signal MQ1ELB000 to a binary ZERO. This enables the Q2 sections of registers 206-8 and 206-10 to apply their contents to their output terminals.

Section 216

FIG. 4a shows in greater detail the reconfiguration section of the preferred embodiment of the present invention. These circuits include the identification section 216-200 of the present invention in addition to the circuits which generate signals for reconfiguring the controller daughter boards in response to diagnostic commands received from central processing unit 40.

As shown, section 216 includes a 3 to 8 binary decoder circuit 216-2, an EDAC mode flip-flop 216-4, a set of controller address switches 216-6, a reconfiguration register 216-8, a reconfiguration mode flip-flop 216-10, a controller address multiplexer circuit 216-12, an address mode multiplexer circuit 216-14, controller address compare circuits of block 216-16 and identification section 216-200.

The decoder circuit 216-2 is enabled for operation when signal LSYEL0010 is forced to a binary ONE and signal LSWRIT010 is forced to a binary ZERO. The circuit 216-2 in response to particular codings of the binary coded signals BSAD21210, BSAD20210 and BSAD19210 applied to its terminals A, B and C forces a corresponding one of its terminals to a binary ZERO. For example, when bits 19, 20 and 21 have the value "000", signal READID000 is forced to a binary ZERO. Similarly, the values "001", "010", "011" and "100" respectively force signals READST000, SETEDA000, RESEDA000 and RECONF000 to binary ZEROS.

As shown, signal SETEDA000 is inverted by an inverter circuit 216-19 and applied to the preset (PR) input terminal of D-type flip-flop 216-4 via a NAND gate 216-18 while signal RESEDA000 is inverted by an inverter circuit 216-21 and applied to the clear (CLR) terminal of the same flip-flop via a NAND gate 216-20. Both NAND gates 216-18 and 216-20 receive timing signal PULS20010 from section 204. The flip-flop 216-4 also receives signal BSMCLR310 from section 211 which is applied to its clock (C) input terminal while its data (D) input terminal is connected to ground. The binary ONE and ZERO output terminals of flip-flop 216-4 are applied respectively as inputs to the identification register 206-22 and to the EDAC circuits of blocks 216-12 and 206-14. The signal EDACMM000 when a binary ZERO causes the sets of check bit signals (i.e., signals MDIEC0-C5) to be forced to binary ZEROS by circuits 216-12 and 216-14.

The signal READID000 is applied to the OC terminal of identification register 206-22 while the complement signal READID110 is applied to the gate (G) input terminal of register 206-24 via an inverter circuit 216-22. Similarly, signal READST000 is applied to the OC terminal of status register 206-20. The signal READID110 and signal READST110 generated by an inverter circuit 216-23 are applied as inputs to data multiplexer circuits 206-16 and 206-18. When either signal READID110 or READST110 is a binary ONE, it inhibits the multiplexer circuits from applying data signals to bus 10. This allows the contents or register 206-20 or 206-22 to be substituted in their place. The status register 206-20 includes a pair of series connected registers, each having even and odd sections. The first register is constructed from standard integrated latch circuits designated as 74LS273. Each section of the latch or buffer register has a clock input which receives a timing signal MYDCNN210 from section 211 in response to the detection of a read error by the circuits of block 206-24. When an uncorrectable error is detected in either the even or odd word, the circuits 206-24 inhibit signal MYDCNN210 from being applied to the section(s) of the latch register. This freezes the contents of the register to facilitate diagnostic testing. The latch register sections are cleared or reset to ZEROS in response to either read status signal READST000 or reset data signal RESEDA000 from section 216 in addition to bus clear signal BSMCLR110.

The output signals from the sections of the latching register are applied to the sections of the second tristate output register which connects to data out lines MUXD00-15. This register also receives signal READST000 which is used to control the readout of the contents of the tristate register to bus 10. The status register arrangement permits updating of read error status conditions in addition to clearing and freezing status as discussed herein.

The last decoder output signal RECONF000 is inverted by an inverter circuit 216-24 and applied as one input to an AND gate 216-26. The AND gate 216-26 receives a battery mode signal BATTMM000 from section 212 which during normal operation is a binary ONE. The timing signal MYDCNN210 from section 211 is applied as a third input to AND gate 216-26. The output signal MCONCK010 is applied to the clock input terminals (CLK) and (C) of the different stages of register 216-8. When signal RECONF010 is forced to a binary ONE by decoder circuit 216-2, timing signal MYDCNN210 causes AND gate 216-26 to force signal MCONCK010 to a binary ONE.

The positive going transition of clocking signal MCONCK010 enables register 216-8 to be loaded with the states of the address bit signals BSAD08210 through BSAD17210 of a bus memory request received from section 207.

It will also be noted that signal MCONCK010 is inverted by an inverter circuit 216-28 and applied as signal MCONST100 to the preset (PR) terminal of flip-flop 216-10. When signal MCONST100 switches to a binary ZERO, flip-flop 216-10 switches to a binary ONE. The data (D) terminal of the flip-flop 216-10 receives signal RCONRS000 generated by a pair of series connected NAND gates 216-30 and 216-32 in response to signals BATTMM010, RECONF110, BSAD07110, BSMREF110 and BSYELO110. The timing signal DCNR60110 is applied to the clock (C) input terminal of flip-flop 216-10 from section 211.

When signal BATTMM200 is a binary ONE indicating that the controller is not in a battery mode of operation and signals BSYELO110, BSMREF110 and BSAD07110 are binary ONES, NAND gate 216-32 forces signal RCONRS000 to a binary ZERO. This enables flip-flop 216-10 to be reset to a binary ZERO state when timing signal DCNR60110 switches from a binary ZERO to a binary ONE.

As shown, certain stages of register 216-8 are cleared in response to a system power up signal PWONLL010 generated by section 211 which switches from a binary ZERO to a binary ONE after system power is established (i.e., valid). Signal PWONLL010 when a binary ZERO causes the register stages to be cleared to ZEROS. The interleave mode flip-flop stage storing signal INTERL000 is powered up in the binary ONE state by signal PWONLL010 applied to the PR input terminal of the stage. That is, signal PWONLL010 when a binary ZERO switches the interleave mode stage to a binary ONE which forces signal INTERL000 to a binary ZERO.

The binary ONE output of reconfiguration mode flip-flop 216-10 is applied as an input to register 206-22, to select control input terminal of enabled multiplexer circuit 216-12 and to NAND gate 216-30.

As seen from FIG. 4a, the multiplexer circuit 216-12 receives a first set of controller address signals BSSW00010 through BSSW03010 from manual switches S1 through S4 as shown. When any of the switches are closed, this forces a corresponding one of the address signals BSSW00010 through BSSW03010 to a binary ZERO. When the same switch is placed in an open position, this causes the corresponding address signal to be a binary ONE. The binary ONE signal provided via one of the pull-up resistors 216-34 through 216-42 which connect to a voltage +V.

The second set of address signals RCONF0010 through RCONF3010 applied to multiplexer circuit 216-12 are from the stages of register 216-8 storing the states of bus address bits BSAD08210 through BSAD11210. When signal RECONF110 is a binary ZERO, the multiplexer circuit 216-12 selects switches S1-S4 as the source of signals BSSW00110 through BSSW03110. When signal RECONF110 is a binary ONE, multiplexer circuit 216-12 selects the indicated stages of register 216-8 as the source of signals BSSW00100 through BSSW03110.

Signals from the remaining switches S5 and S6 are applied as inputs to the compare circuits 216-16 and to the multiplexer circuit 216-14. That is, signal INTESW000 is applied via series connected inverter circuit 216-44 and a NOR gate 216-46 to the select control input terminal of multiplexer circuit 216-14. The state of switch S5 defined whether or not the controller is operating in an interleaved or banked mode of operation. When switch S5 is open, signal INTESW000 is a binary ONE and the controller's addressing mode is defined by the state of the interleave mode flip-flop stage which is set to a binary ONE during power-up. This causes signal INTERL000 to be a binary ZERO. This causes NOR gate 216-46 to force signal INTERL110 to a binary ONE. When signal INTERL110 is a binary ONE, multiplexer circuit 216-14 selects address bit signals BSAD03110, BSAD04110 and BSAD05110 as the source of signals BSADX3010, BSADX4010 and BSADX5010.

A banked mode of operation is specified either by placing switch S5 in the closed position or by switching the interleave mode flip-flop stage to a binary ZERO during controller reconfiguration when bus address bit signal BSAD17210 is a binary ZERO. This results in forcing signal INTERL110 to a binary ZERO which causes multiplexer circuit 216-14 to select address bit signals BSAD04110, BSAD05110 and BSAD18110 as the source of signals BSADX3010, BSADX4010 and BSADX5010.

The signal BSADX5010 is applied to a row address register via the queue registers of section 207. The queue registers provide the required storage of memory request addresses for an entire memory cycle of operation.

The signals BSADX3010 and BSADX4110 are logically combined with configuration signals HALFBS010 and QARTBS010 within a pair of exclusive OR circuits 216-50 and 216-52 as shown. The resulting signals BSADX3110 and BSADX4110 are applied as inputs to section 207 for decoding. Additionally, signals HALFBS010 and QARTBS010 are applied as inputs to identification register 206-22 along with interleave mode signal INTERL110 generated by NOR gate 216-46.

The last switch signal MODINH000 applied via an inverter circuit 216-54 is used for enabling/disabling the compare circuits of block 216-16. When switch S6 is placed in an open position, signal MODINH000 is a binary ONE. When in this state, each of the comparison circuits 216-160 and 216-162 are enabled for operation. When switch S6 is placed in a closed position, signal MODINH000 is a binary ZERO and the circuits 216-160 and 216-162 are disabled.

Now considering the circuits of block 216-16, it is seen that the comparison circuit 216-160 receives those controller address input signals used for memory communication when the controller is operating in an interleaved mode of operation. The comparison circuit 216-162 receives those controller address input signals used for memory communication in a banked mode of operation. When either circuit 216-160 or 216-162 detects a true comparison, it forces a corresponding one of the signals MYADG0100 and MYADG0200 from a binary ONE to a binary ZERO. This in turn causes an AND gate 216-164 which receives signals MYADG0100 and MYADG0200 to force its output signal MYADG0001 from a binary ONE to a binary ZERO. The signal MYADG0001 which is applied as an input to the bus response circuits of section 211 causes an appropriate response to be generated.

Section 216-200

In accordance with the teachings of the present invention, section 216-200 includes two generating circuits 216-202 and 216-204. The circuit 216-204 generates a 4-bit binary code specifying the type of controller while circuit 216-202 generates a 3-bit binary code specifying the controller hardware revision. As shown, the circuit 216-202 includes a plurality of input terminals J02A, J02B and J02C and a corresponding number of output terminals J03A, J03B and J03C. All of the input terminals connect to a ground reference potential. Each of the output terminals connect to the voltage source +V through a different one of the resistors 216-210 through 216-214, as shown.

As indicated by the dotted lines, the output terminals are selectively prewired through connectors to corresponding ones of the input terminals to connect to a ground reference potential. By such prewiring, signals HWREV1010, HWREV2010 and HWREV4010 are coded to identify the type of controller associated therewith.

In accordance with the invention teachings, the circuit 216-202 is constructed so that signals HWREV1010 through HWREV4010 are preassigned an all ZEROS type code for designating a particular controller design having a given functionality or set of features. In such a case, all three output terminals J03A through J03C are prewired by jumpers/connectors to ground.

A controller having a revision of the type 0 controller has circuit 216-202 constructed so that signals HWREV4010 through HWREV1010 are preassigned an "001" revision code. Accordingly, only output terminal J03A is prewired to input terminal J02A while output terminals J03B and J03C remain unconnected. As changes are made in the particular controller printed circuit board or artwork to correct a design deficiency or change brought about by unusual occurrences of system operating conditions or events, the next sequential binary code is assigned to the design change. Accordingly, for each design change or hardware revision made to a particular controller type, a different binary code is preassigned. Since the revision code is a 3-bit code, the circuit 216-202 can be constructed to designate one of up to $2^3$ or 8 unique hardware revisions.

Figure 4B:
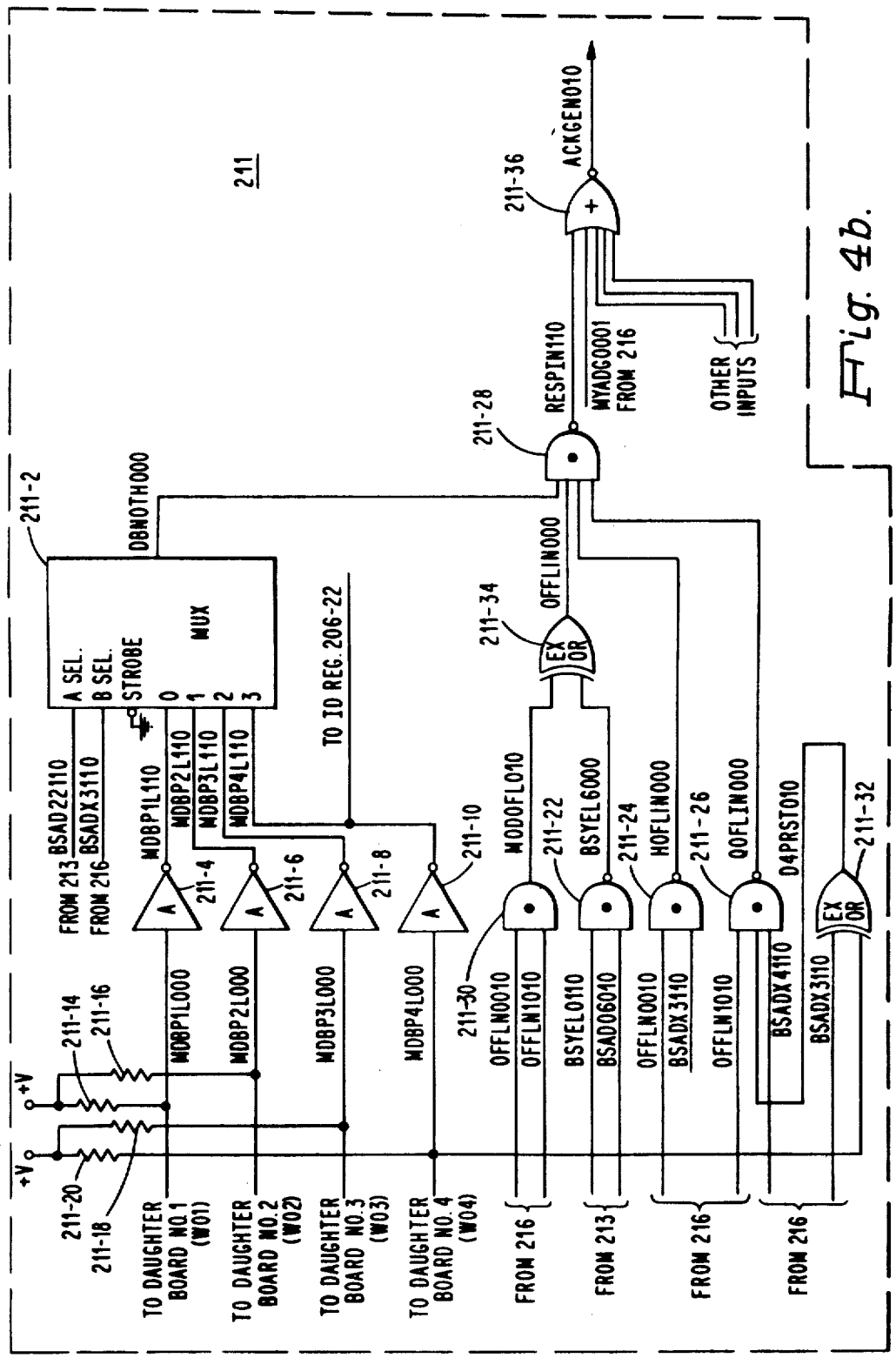

As seen from FIG. 4b, the circuit 216-204 is constructed in a manner which is similar to circuit 216-202. More specifically, circuit 216-204 includes a plurality of input terminals J02D through J02G and a corresponding number of output terminals J03D through J03G. All of the input terminals connect to ground. Each of the output terminals connect to the voltage source +V through a different one of the resistors 216-216 through 216-222, as shown.

As indicated by the dotted lines, the output terminals are selectively prewired through connectors to corresponding ones of the input terminals to ground. By such prewiring, signals MDTYP1010, MDTYP2010, MDTYP4010 and MDTYP8010 are coded to identify the functionality or type of controller associated therewith.

In accordance with the invention teachings, circuit 216-204 is constructed so that signals MDTYP1010 through MDTYP8010 are preassigned on all ZEROS type code for designating the initial design of a particular controller type. The different functionality or different set of features could involve the use of a different size memory chip (e.g. 256 K chip in lieu of 64 K chip), a different error detection and correction (EDAC) scheme or the addition of a new feature or capability (e.g. alpha particle correction feature). In all such cases, such different functionality necessitates the development of new artwork or a printed circuit board (PCB) design. For each different controller design, a different binary code is preassigned. Since the type code is a 4-bit code, the circuit 216-204 can be constructed to designate one of up to $2^4$ or 16 unique types of controllers.

As indicated by FIG. 4b, the 4-bit type code and 3-bit hardware revision code are applied to identification register 206-22. More specifically, signals MDTYP8010 through MDTYP1010 are applied as inputs to bit positions 0-3 of identification register 206-22. The signals HWREV4010 through HWREV1010 are applied as inputs to bit positions 4-6 of identification register 206-22. The two sets of signals are loaded into the register 206-22 in response to signal READID110 generated by inverter circuit 216-22.

Section 211

FIG. 4b shows in greater detail a portion of the bus response circuits of the preferred embodiment of the present invention. These circuits operate to provide the appropriate responses to memory commands addressed to the controller. The response circuits include a data selector circuit 211-2, a plurality of inverter circuits 211-4 through 211-10 and associated pull-up resistors 211-14 through 211-20, a plurality of NAND gates 211-22 through 211-28, an AND gate 211-30, a pair of exclusive OR circuits 211-32 and 211-34 and a NOR gate 211-36 connected as shown.

The circuit 211-2 is connected to receive data signals MDBP1L110 through MDBP4L110 generated by corresponding ones of up to four memory daughter boards. In greater detail, when each of the four daughter boards are connected in the memory subsystem, the signals MDBP1L000 through MDBP4L000 are binary ZEROS. That is, the inputs to each of the inverter circuits 211-4 through 211-10 are grounded. This in turn forces MDBP1L110 through MDBP4L110 to binary ONES. However, when any daughter board is missing, this causes a corresponding one of the signals MDBP1L000 through MDBP4L000 to be a binary ONE. That is, the input from the daughter board is floating or not connected which applies voltage +V through a pull-up resistor to the input of one of the inverter circuits 211-4 through 211-10.

Address signals BSAD22110 and BSADX3110 identifying the daughter board being addressed are applied to the select input terminals of data selector circuit 211-2. The circuit 211-2 applies as a source of output daughter board not here signal DBNOTH000, the daughter board signal selected by signals BSAD22110 and BSADX3110. When the daughter board being addressed is connected to the controller, signal DBNOTH000 is forced to a binary ONE. However, when the addressed daughter board is not present (e.g. half populated controller), signal DBNOTH000 is forced to a binary ZERO state.

The signal DBNOTH000 is applied as one input to NAND gate 211-28. The three other input signals OFFLIN000, HOFLIN000, QOFLIN000 to NAND gate 211-28 provide the capabilities of operating the controller memory off-line (i.e., full controller memory off-line, half controller memory off-line and quarter controller memory off-line).

Signal OFFLIN000 is generated by gates 211-22, 211-30 and 211-34. When signal OFFLIN000 is forced to a binary ZERO in response to a diagnostic command, this indicates that a full controller memory as shown in FIG. 1 is in the off-line state. Signal OFFLIN000 is generated by forming exclusive OR signals MODOFL010 and BSYEL6000 generated by gates 211-30 and 211-22. Signal MODOFL010 is generated by AND gate 211-30 which combines signals OFFLN0000 and OFFLN1010 received from section 216. Signal BSYEL6000 is generated by NAND gate 211-22 which combines bus signals BSYEL0110 and BSAD06010 received from section 213. Thus, the exclusive ORing of signals MODOFL010 and BSYEL6000 by gate 211-34 enables off-line communication with a controller during diagnostic cycles.

The signals HOFLIN000 and QOFLIN000, respectively, indicate when the controller is being operated in half off-line and quarter off line mode of operation. When any one of the signals DBNOTH000 through QOFLIN000 is forced to a binary ZERO, NAND gate 211-28 forces response signal RESPIN110 to a binary ONE. This inhibits NOR gate 211-36 from forcing acknowledge signal ACKGEN010 to a binary ONE. Hence, the controller does not generate a response to memory requests when the controller is operating in off-line, half off-line and quarter off-line modes of operation (i.e., full memory, half memory or quarter memory sections of the controller have been placed in an off-line state or have not been installed (e.g. half populated controller).

DESCRIPTION OF OPERATION

With reference to FIGS. 1 through 4b, the operation of the memory system of the present invention will now be described with particular reference to the diagrams of FIGS. 7 through 9.

Before discussing an example of operation, reference is first made to FIGS. 5a and 5b. FIG. 5a illustrates the format of the memory addresses applied to the controller as part of each memory read or write request when the system of FIG. 1 is being operated in banked mode. The four high order/most significant bit positions 0-3 are coded to identify which of the sixteen memory controllers is to process the request. Address bit 4 is used to select which 256 K half (i.e., upper or lower half) of controller memory is being accessed. Also, bit 4 together with address bit 5 are coded to select which row of RAM chips are being addressed. As discussed hereon, these bits are decoded and used to generate a row address strobe (RAS) signal which latches the 8-bit row addresses into the desired row of RAM chips within a pair of memory stacks. These address bits are processed by the circuits of each controller and are not provided to the RAM chips.

Address bits 6-21 specify the address of the 22-bit storage location within the RAM chips being addressed. As explained in greater detail herein, these 16 address bits are multiplexed into 8 address inputs and applied via the address buffer circuits of block 210.

The least significant address bits 22 and 23 are coded to select which word and byte are being addressed.

FIG. 5b illustrates the format of the memory addresses when the system of FIG. 1 is being operated in interleaved mode. The differences as seen from the Figures are that the most significant bit positions 0-2 and bit 18 identify the controller which is to process the request. Address bit 3 is used to select which 256 K half of controller memory is being accessed. Bits 3 and 4 select the row of RAM chips being addressed and address bits 5-21 excluding bit 18 specifying the location being addressed.

Figure 6C:
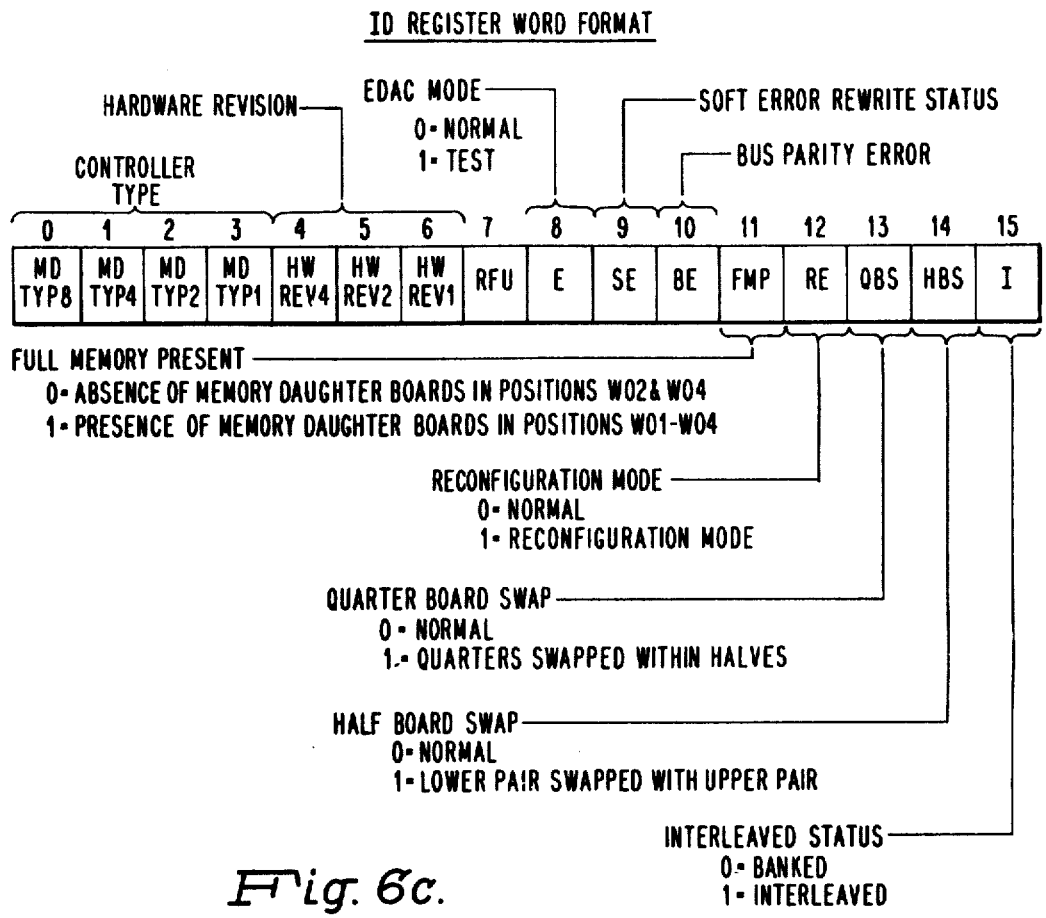
FIG. 6c illustrates the format of the identification register 206-20 of FIG. 3 in accordance with the teachings of the present invention.
Figure 6D:
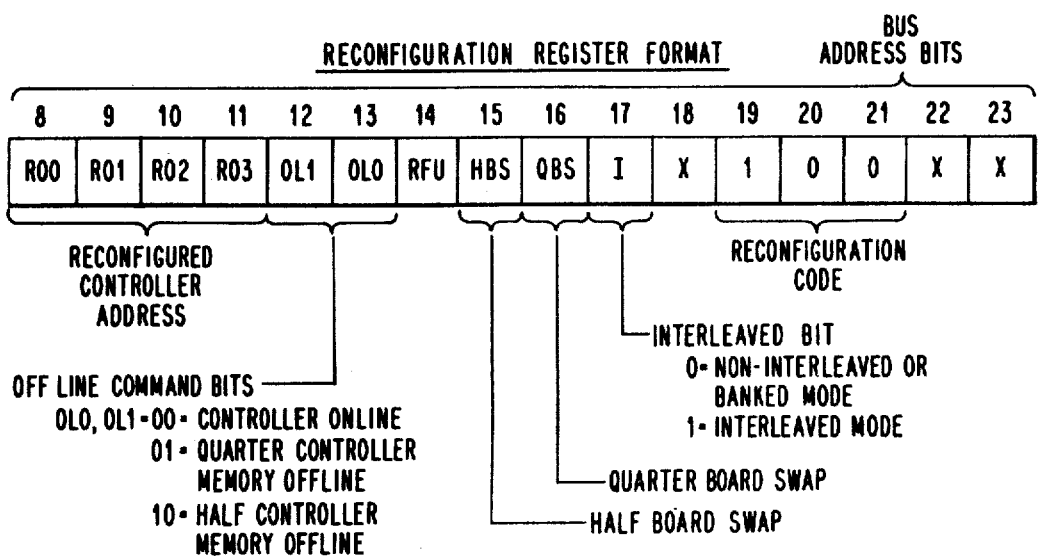
FIG. 6d illustrates the format of a reconfiguration register included within reconfiguration section 216 of FIG. 3.

FIG. 6d illustrates the format of the memory address to be loaded into the reconfiguration register 216-8 of an addressed controller which is applied as part of a command specifying a reconfiguration operation. Address bits 19, 20, and 21 define the type of operation to be performed. As seen from FIG. 6d, the diagnostic code "100" causes the addressed controller to be placed in a reconfigured mode. Before discussing this mode, as indicated previously, other codes such as "010", place the controller in an EDAC test mode wherein the controller reads out the contents of the location being addressed and transfers that the contents to bus 10. While in this mode, the controller inhibits the generation of certain bus error indicator signals generated by circuits 206-24 of FIG. 3 during read cycles and forces the check bit signals to ZEROS during write cycles.

A diagnostic code of "011" causes a controller to reset the EDAC mode. In response to this code, the controller clears status and EDAC check bit indicators and reads the contents of the location being addressed and transfers the contents to bus 10.

As discussed herein, a diagnostic code of "000" specifies a read identification register operation and causes the controller to read out the contents of the location being addressed. However, the controller substitutes the contents of identification register 206-22 for the contents of the addressed location and transfers same to bus 10. In a similar fashion, a code of "001" causes the controller to transfer the contents of status register 206-20 to bus 10 in place of the contents of the addressed location.

FIGS. 6a and 6c illustrate the formats of the contents of status register 206-20 and identification register 206-22 in accordance with the present invention. As seen from FIG. 6a, the 16-bit register stores combinations of decode address bits (i.e., LSADX3010 and LSADX4010) from an address register of section 207 and syndrome bits S0 through S5 which allow the isolation of single bit errors to the RAM chip. For further information regarding the generation and detection of errors using syndrome bits, reference may be made to U.S. Pat. No. 4,072,853. As mentioned previously, the status register 206-20 stores syndrome signals indicative of the most recent single bit error. Upon the occurrence of an uncorrectable error (i.e., double bit error), the red generator circuits of block 206-24 generate signals which freeze the contents of the status register 206-20.

As seen from FIG. 6c, in accordance with the present invention, the identification register 206-22 stores indications of controller's type and hardware revision in addition to reconfiguration mode, addressing mode and other status information. As mentioned previously, bit positions 0-3 store controller type signals MDTYP8010 through MDTYP1010 received from circuit 216-204. Bit positions 4-6 store controller hardware revision signals HWREV4010 through HWREV1010 received from circuit 216-202. Bit position 8 stores the state of EDAC mode flip-flop 216-4. Bit positions 9 and 10 store indications of soft errors and bus parity errors. The soft error status indicates the result of performing memory rewrite operations at normal memory speed or at faster speeds. For the purpose of the present invention, such indications further define the operability of memory. The copending patent application of Robert B. Johnson and Chester M. Nibby, Jr. entitled "A Method and Apparatus for Testing and Verifying the Operation of Error Control Apparatus Included Within a Memory System", issued as U.S. Pat. No. 4,359,771 on Nov. 16, 1982 and assigned to the same assignee as named herein.

Bit position 11 stores the state of signal MDBP4L110 generated by the circuits of section 211 of FIG. 4b. Bit position 12 stores the state of reconfiguration mode flip-flop 216-10. Bit positions 13 through 15 store indications of certain ones of the stages of reconfiguration register 216-6, such as the states of the quarter board swap, half board swap and interleave mode stages.

Referring to FIG. 1, it will be assumed that the system of FIG. 1 includes memory controllers of different design types with different hardware revisions. More particularly, the system can include an arrangement of memory controller pair such as shown in FIG. 8. The memory controller boards of each pair are organized as shown in FIG. 6b.

Figure 8:
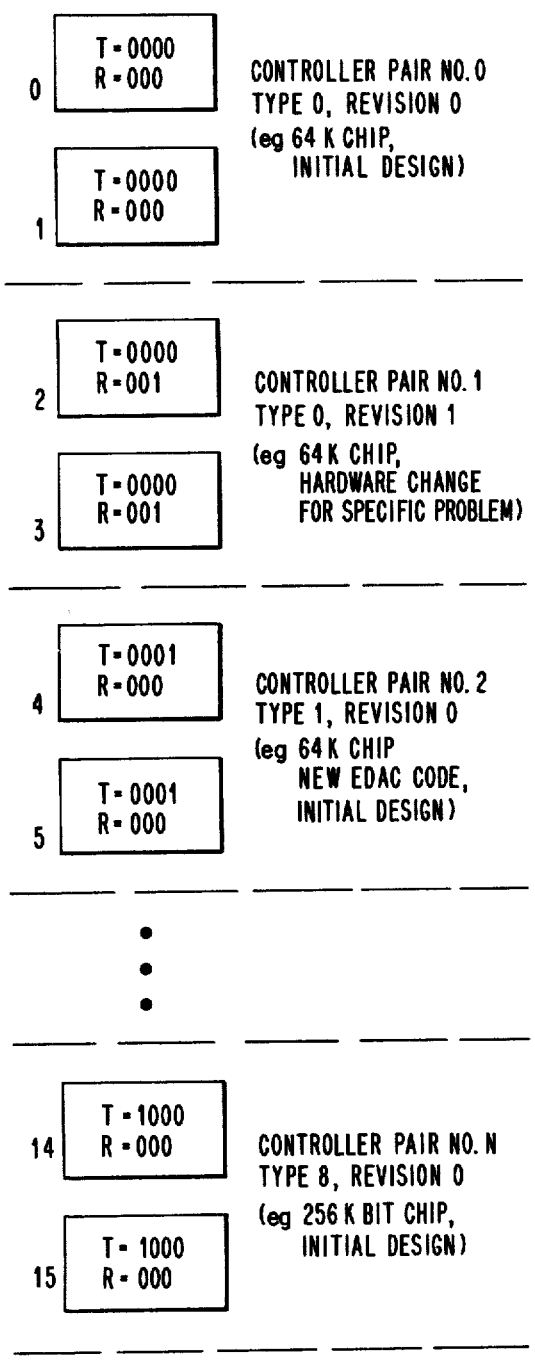
Figure 9:
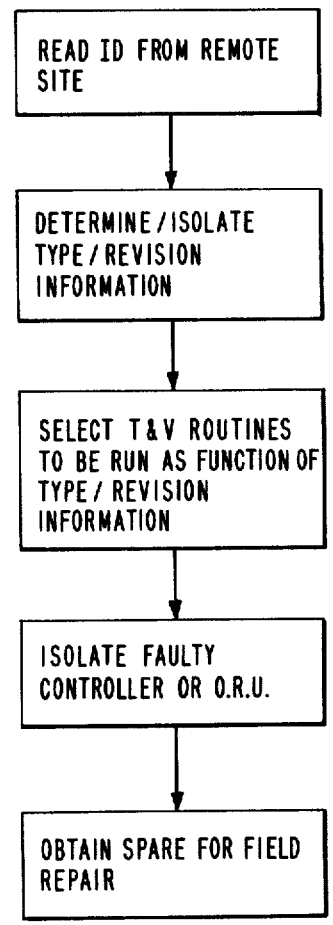

In accordance with the teachings of the present invention, each controller is constructed to generate the preassigned type and hardware binary codes indicated in FIG. 8. For example, the identification section of each of the controllers 200-1 and 200-2 which comprise controller pair #0 is constructed such that circuit 216-204 generates an all ZERO type code and circuit 216-202 generates an all ZERO hardware revision code. As indicated by FIG. 8, this preassigned coding specifies that this is a particular controller design which is based upon a 64 K chip (type 0) and that the design is an initial design in that no hardware revisions have been included (Revision 0).

The next pair of controllers (pair #1) include identification sections, each of which is constructed such that circuit 216-204 generates an all ZERO type code and circuit 216-202 generates an "001" hardware revision code.

As seen from FIG. 8, this preassigned coding specifies that this is the same controller design (type 0) as pair #0 which is based upon a 64 K chip. However, because of a specific problem, the design has undergone a first hardware change (Revision 1).

The next controller pair (pair #2) corresponds to a new type of controller design. That is, the identification section of each controller of pair #2 is constructed such that circuit 216-204 generates an "001" type code and circuit 216-202 generates an all ZERO hardware revision code. As seen from FIG. 8, this preassigned coding specifies that this pair is a later type of controller design (type 1) which is based upon a new error detection and correction (EDAC) code and again utilizes a 64K chip. Also, such preassigned coding indicates that this design is an initial design in that no hardware changes have been included (Revision 0). It should be noted that since each controller contains the same memory capacity, they can be intermixed. The pair arrangement shown is only for illustration purposes.

The last pair of controllers (pair #n) corresponds to the latest type of controller design. That is, the identification section of each controller of pair #n is constructed so that circuit 216-204 generates a 1000 type code and circuit 216-202 generates an all ZERO hardware revision code. As seen from FIG. 8, this preassigned coding specifies that this pair is the latest type of controller design (type 8) which is based upon a 256K ship. Also, the type of design has undergone no hardware changes (Revision 0).

It can be assumed that the other controller pairs, not shown, are of different types and revisions such that their identification sections are preassigned type codes of 0001 through 0111 and hardware revision codes of 000-111.

It can be seen that the complexity and selection of diagnostic programs and routines for isolating the faulty controller within the system of FIG. 1 in response to detecting an error condition can prove time consuming. However, the apparatus of the present invention can reduce this time considerably as shown in FIG. 7.

Figure 7:
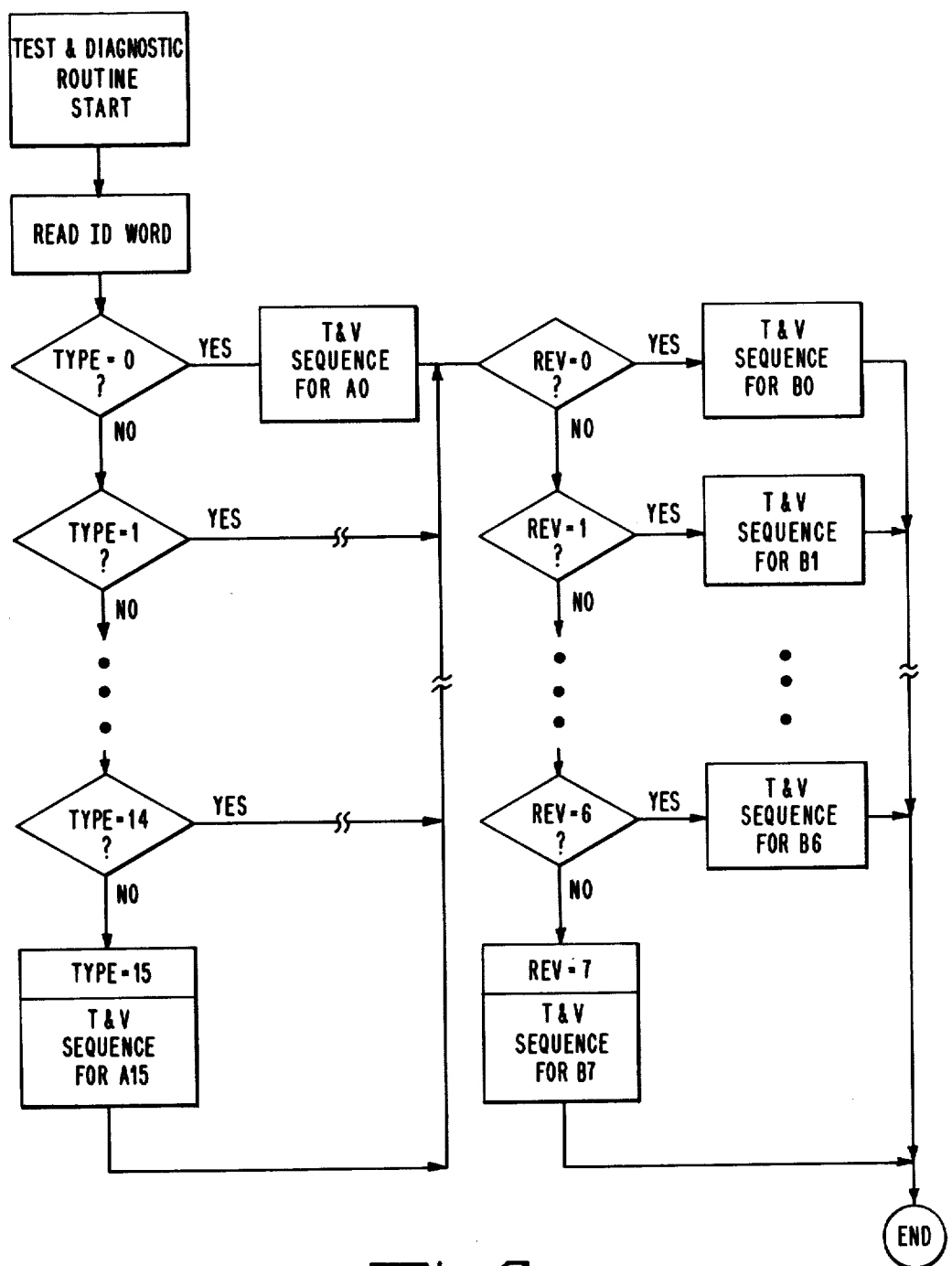
FIGS. 7 through 9 are used in explaining the opertion of the apparatus of the present invention.

However, before carrying out the operations indicated in FIG. 7, the central processing unit 40 will have carried out certain preliminary operations involving the controller or controllers of FIG. 1 which reported the detection of an uncorrectable error condition. In accordance with the present invention, such operations involve the issuance of diagnostic commands specifying the read out of status register 206-20 and identification register 206-22.

In greater detail, the controller decoder circuit 216-2, in response to decoding the read status word command, forces signal READST000 to the binary ZERO and signal READST010 to a binary ONE. These signals condition register 206-20 and data out multiplexer circuits 206-16 and 206-18 for read out of the status information contents of register 206-20 to bus 10 via lines MUXD00-15.

The controller decoder circuit 216-2, in response to decoding the read ID work command, forces signal READID000 to a binary ZERO and signal READID010 to a binary ONE. Signal READID010 causes the coded type and hardware revision signals from section 216-200 together with the other input signals to be loaded into ID register 206-22. Signals READID000 and READID010 condition ID register 206-22 and data out muliplexer circuits 206-16 and 206-18 for read out of the ID information contents of register 206-22 to bus 10 via lines MUXD00-15.

From the status information of FIG. 6a, together with the coded type and hardware revision identification information transferred by the controller section 216, it is now possible to determine whether the controller is faulty and if faulty which portion or portions. Such testing is carried out by having the central processing unit 40 and controller perform the series of operations indicated in FIG. 7.

As seen from FIG. 7, central processing unit 40 reads the ID word into one of its working registers enabling it easy access to the type code and hardware revision code which uniquely identifies the functionality or features included in the controller. Next, central processing unit 40 tests the type code to determine its value. For the purpose of the present invention, it can be assumed that such testing is performed in a conventional manner.

Depending upon the result, central processing unit branches to the appropriate test and verification (T&V) sequence for exercising the controller having that particular type of design.

FIG. 7 depicts separate test and verification sequences for each possible different type code for sake of simplicity. Actually, central processing unit 40, based upon its testing of the type code, enters particular entry point within a series of test and verification routines. Upon selecting the appropriate entry point, central processing unit 40 issues further diagnostic commands. Such commands normally include those for placing the controller into the EDAC test mode. It will be appreciated that a portion of the test and verification routines used for testing the EDAC apparatus controller pair #2 differs in part from the test and verification routines used for testing the EDAC apparatus of other controller pairs such as pairs #0 and #1. These differences may reside primarily in the use of different data patterns. However, there will be a substantial portion of the test and verification routines that are the same. Accordingly, this type of redundancy is eliminated.

It will be appreciated that certain types of controller designs may include soft error correction apparatus while other types do not. The same is true for refresh apparatus. Accordingly, soft error correction and refresh test and verification routines are eliminated in those cases by the central processing unit 40's testing of the type code in accordance with the present invention.

The actual details of such testing for the purposes of the present invention can be considered conventional in design and do not form a part of this invention. For a further discussion of such testing, reference may be made to the copending patent application of Robert B. Johnson and Chester M. Nibby, Jr. entitled "A Method and Apparatus for Testing and Verifying the Operation of Error Control Apparatus Included within a Memory System", issued as U.S. Pat. No. 4,359,771 on Nov. 16, 1982 and assigned to the same assignee as named herein.

Following such testing, central processing unit 40 begins testing the hardware revision code. This enables the selection of further routines which provides testing of hardware changes made to the initial design for a given type of controller design. For example, the certain sets of conditions or logical events which necessitated the change can be simulated by a test and verification sequence to determine whether or not the controller is functioning properly. For eample, a specific hardware revision may have been made to the controller logic circuits which fetch a double word from memory to overcome a problem occurring under the specific sequence of conditions. In those controller designs which do not include that change, the test and verification sequence includes routines for simulating the specific sequence of conditions which caused the problem for determining whether or not the controller is faulty. Thus, this test and verification sequence is used for all controllers of a given type which have been preassigned hardware revision codes below that hardware revision code. However, the test and verification sequence is eliminated for all controllers of the same type having that hardware revision code or a higher code.

While different test and verification sequences have been shown for each different hardware revision code, these sequences can correspond to different entry points within one or more sequences. Accordingly, any redundancies in test routines can be eliminated.

As seen from FIG. 7, upon completing testing of the controller apparatus or section associated with a particular hardware revision, the central processing unit 40 has determined whether or not the controller is operating properly. If it is not, central processing unit 40 can issue a reconfiguration command which will disconnect the faulty controller from the system as discussed in the related patent application cited herein. When the controller is operating properly, central processing unit 40 continues its testing of the other memory controllers in the manner previously described.

In the above example, it was assumed that testing was done locally. It will be appreciated that the same testing can be carried out at a remote location or site as shown in Fig. 9. In such instances, central processing unit 40 is located locally while the remainder of the system of FIG. 1 resides at another location. As seen from FIG. 9, the central processing unit 40 issues a diagnostic command which obtains the contents of the ID register 206-22 from one of the memory controllers at the remote site. The selection of a particular controller is based upon examining the contents of the controller status registers as a consequence of the system having detected an uncorrectable error condition.

In the manner previously described, central processing unit 40 carries out test and verification operations upon the selected controller as a function of the controller's type and hardware revision codes. In accordance with such testing, the faulty controller or faulty optimum replacement unit (ORU) can be isolated. Once this is done, maintenance personnel can obtain the required replacement unit and bring it to the remote site. Thus, the apporpriate replacement controller corresponding to the correct type and hardware revision can be selected within a minimum of time.

As seen from the above, the apparatus of the present invention enables rapid diagnosis of faults within controllers. This is accomplished by enabling the selection of the appropriate test and verification routines for accurately testing and verifying the operation of a particular controller design associated with an error condition. By eliminating the need to carry out nonmeaningful diagnostic tests, system down time is reduced. This is particularly important when a system includes a mixture of controller types and types having a number of different hardware revisions. Also, the above advantages of the present invention are achieved through a minimal amount of additional apparatus being added to each controller of a system.

It will be obvious to those skilled in the art that many changes may be made to the apparatus of the present invention. For example, different coding arrangements may be utilized and such coding may be expanded to further define the controller design construction.

The type of controller status information used in conjunction with the present invention may be changed or altered as a function of controller designs and operational capabilities. Also, many changes in the types and organizations of diagnostic sequences and test and verification routines will occur to those skilled in the art.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A data processing system comprising a data processing unit and a plurality of addressable controllers coupled in common to a bus for receiving commands and data from said data processing unit, each command including a code specifying the type of operation to be performed by the controller specified by said command and each controller including:

a control section coupled to said bus, said section comprising:

first circuit means selectively prewired for generating a first multibit binary code designating the design used in constructing said controller in which said first circuit means is included;

second circuit means selectively prewired for generating a second multibit binary code designating the hardware revision of said controller in which said second circuit means is included;

decode circuit means coupled to said bus, said decode circuit means being operative in response to a first predetermined type of said commands to generate a first output signal; and, identification register means operatively coupled to said bus, to said decode circuit means and to said first and second circuit means, said register means being operative to store signals corresponding to said first and second multibit codes and said register means being conditioned by said output signal to apply said first and second multibit codes to said bus for transfer to said data processing unit for enabling selection of diagnostic test and verification routines for testing said controller.

2. The system of claim 1 wherein said each controller includes a plurality of sections and further includes:

a status register operatively coupled to said bus, said status register inluding a pair of series connected registers, a first register of said pair being connected to different ones of said plurality sections for storing status signals indicative of the operational characteristics of corresponding ones of said sections used for isolating memory faults and a second register of said pair being connected to said first register for storing said status signals received from said first register, said second register being coupled to said bus and to said decode circuit means; and said decode circuit means being operative in response to a second predetermined type of said commands to generate second output signal for conditioning said second register to apply said status signals to said bus for transfer to said data processing unit.

3. The system of claim 2 wherein said data processing unit includes means for storing said first and second multibit binary codes and said status signals, and means for interpreting said status signals using said first and second multibit binary codes to determine whether or not said controller is faulty.

4. The system of claim 1 wherein each of said first circuit means of said controllers is prewired to generate said first multibit binary code which is sequentially preassigned for designating successive controller designs having different functionalities requiring different artworks.

5. The system of claim 4 wherein said first circuit means included in each of said controllers constructed from a first design having a first functionality prewired to generate said first multibit binary code precoded to have al all ZERO value.

6. The system of claim 4 wherein said first circuit means included in each of said controllers constructed from a second design having a second functionality is prewired to generate said first multibit binary code precoded to have a value 0001.

7. The system of claim 4 wherein each of said second circuit means of said controllers is prewired to generate said second multibit binary code which is sequentially preassigned for designating successive hardware revisions of the controller designs specified by said first multibit binary codes.

8. The system of claim 7 wherein said second circuit means included in each of said controllers constructed from an initial design having no hardware revisions is prewired to generate said second multibit binary code precoded to have an all ZERO value.

9. The system of claim 7 wherein said second circuit means included in each of said controllers constructed from a first hardware revision of the design specified by said first multibit binary code is prewired to generate said second multibit binary code precoded to have a value 001.

10. The system of claim 1 wherein said first circuit means includes:
a plurality of input terminals and a corresponding plurality of input terminals and a corrsponding plurality of output terminals;
a voltage source generating a voltage value corresponding to a binary ONE bit code;
a plurality of resistors corresponding in number to the number of bits included in said first multibit binary code, one end of each of said plurality of resistors being connected to said voltage source and the other end of each of said plurality of resistors being connected to a different one of said plurality of output terminals;
conductor circuit means connecting each of said plurality of input terminals to a reference potential having a voltage value corresponding to a binary ZERO bit code; and,
a plurality of jumpers corresponding in number to the number of binary ZERO bits contained in said first multibit binary code, said plurality of jumpers being prewired to connect those output terminals generating binary ZERO bit codes to corresponding ones of said plurality of input terminals so as to generate said first multibit code designating the design of said controller in which said first circuit means has been included.

11. The system of claim 1 wherein said second circuit means includes:
a plurality of input terminals and a corresponding number of output terminals;
a voltage source generating a voltage value corresponding to a binary ONE bit code;
a plurality of resistors corresonding in number to the number of bits included in said second multibit binary code, one end of each of said plurality of resistors being connected to said voltage source and the other end of each of said plurality of resistors being connected to a different one of said plurality of output terminals;
conductor circuit means connecting each of said plurality of input terminals to a reference potential having a voltage value corresponding to a binary ZERO bit code; and,
a plurality of jumpers corresponding in number to the number of binary ZERO bits contained in said second multibit binary code, said plurality of jumpers being prewired to connect those output terminals generating binary ZERO bit codes to corresponding ones of said plurality of input terminals so as to generate said second multibit code designating the hardware revision of the controller design in which said second circuit means has been included.

12. The system of claim 10 wherein said number of bits corresponds in number to at least the value of 4 for specifying at least 16 types or different functionalities for said plurality of controllers.

13. The system of claim 11 wherein said number of bits corresponds in number to at least the value of 3 for specifying at least eight hardware revisions for each type of controller within said plurality of controllers.

14. The system of claim 1 wherein said data processing unit during the performance of diagnostic operations references a first series of test and verification routines used in testing different types of controllers, said processing unit being operative to use said first multibit binary code for selecting the starting entry point within said first series of routines so as to eliminate redundancies in said test and verification routines.

15. The system of claim 14 wherein said data processing unit upon completing the execution of the portion of said first series of routines, operates to reference a further group of routines for testing hardware changes made to said different types of controllers, said processing unit using said second multibit binary code for selecting the entry point within said group of routines so as to eliminate execution of routines for hardware changes not included within the controller being tested.

16. A data processing system comprising a data processing unit and a memory system including a plurality of addressable memory controllers, each controller for controlling the operation of a number of memory modules and said controllers being coupled in common to a bus for receiving memory commands and data from said data processing unit, each memory command including a code specifying the type of operation to be performed by the controller specified by said command and each memory controller including:
a control section coupled to said bus, said section comprising:
first circuit means having a plurality of input terminals and a corresponding plurality of output terminals, said input terminals being selectively prewired to said output terminals for generating a first multibit binary code at said output terminals designating the type of design used in constructing said each controller;
second circuit means having a plurality of input terminals and a corresponding number of output terminals, said input terminals being selectively prewired to said output terminals for generating a second multibit binary code at said output terminals designating the hardware revision of each said controller; and
decode circuit means coupled to said bus, said decode circuit means being operative in response to a first diagnostic predetermined type of memory command to generate a first output signal; and
a multibit identification register operatively coupled to said bus, said identification register including at least one control terminal coupled to said decode circuit means and a number of input terminals, a first group of said number of input terminals being connected to said output terminals of said first circuit means and a second group of said number of input terminals being connected to said output terminals of said second circuit means, said register being conditioned by said output signal to apply said first and second multibit binary codes to said bus for transfer to said data processing unit for enabling selection of diagnostic test and verification routines for testing said each controller.

17. The system of claim 16 wherein said each controller includes a plurality of sections and further includes:
a status register operatively coupled to said bus, said status register including a pair of series connected registers, a first register of said pair being connected to different ones of said plurality sections for storing status signals indicative of the operational characteristics of corresponding ones of said sections used for isolating memory faults and a second register of said pair being connected to said first register for storing said status signals received from said first register, said second register being coupled to said bus and to said decode circuit means; and said decode circuit means being operative in response to a second predetermined type of memory command to generate a second output signal for conditioning said second register to apply said status signals to said bus for transfer to said data processing unit.

18. The system of claim 17 wherein said data processing unit includes means for storing said first and second multibit binary codes and said status signals, and means for interpreting said status signals using said first and second multibit binary codes to determine whether or not said controller is faulty.

19. The system of claim 16 wherein each of said first circuit means of said controllers is prewired to generate said first multibit binary code which is sequentially preassigned for designating successive controller designs having different functionalities requiring different artworks.

20. The system of claim 19 wherein said first circuit means included in each of said controllers constructed from a first design having a first functionality prewired to generate said first multibit binary code precoded to have an all ZERO value.

21. The system of claim 19 wherein said first circuit means included in each of said controllers constructed from a second design having a second functionality is prewired to generate said first multibit binary code precoded to have a value 0001.

22. The system of claim 19 wherein said second circuit means of said controllers are prewired to generate said second multibit binary codes which are sequentially preassigned for designating successive hardware revisions of the controller designs specified by said first multibit binary codes.

23. The system of claim 22 wherein said second circuit means included in each of said controllers constructed from an initial design having no hardware revisions is prewired to generate said second multibit binary code precoded to have an all ZERO value.

24. The system of claim 23 wherein said second circuit means included in each of said controllers constructed from a first hardware revision of the design specified by said first multibit binary code is prewired to generate said second multibit binary code precoded to have a value 001.

25. The system of claim 16 wherein said first circuit means includes:

a voltage source generating a voltage value corresponding to a binary ONE bit code;

a plurality of resistors corresponding in number to the number of bits included in said first multibit binary code, one end of each of said plurality of resistors being connected to said voltage source and the other end of each of said plurality of resistors being connected to a different one of said plurality of output terminals;

conductor circuit means connecting each of said plurality of input terminals to a reference potential having a voltage value corresponding to a binary ZERO bit code; and, a plurality of jumpers corresponding in number to the number of binary ZERO bits contained in said first multibit binary code, said plurality of jumpers being prewired to connect those output terminals generating binary ZERO bit codes to corresponding ones of said plurality of input terminals so as to generate said first multibit code designating the design of said controller in which said first circuit means has been included.

26. The system of claim 16 wherein said second circuit means includes:

a voltage source generating a voltage value corresponding to a binary ONE bit code;

a plurality of resistors corresponding in number to the number of bits included in said second multibit binary code, one end of each of said plurality of resistors being connected to said voltage source and the other end of each of said plurality of resistors being connected to a different one of said plurality of output terminals;

conductor circuit means connecting each of said plurality of input terminals to a reference potential having a voltage value corresponding to a binary ZERO bit code; and, a plurality of jumpers corresponding in number to the number of binary ZERO bits contained in said second multibit binary code, said plurality of jumpers being prewired to connect those output terminals generating binary ZERO bit codes to corresponding ones of said plurality of input terminals so as to generate said second multibit code designating the hardware revision of the controller design in which said second circuit means has been included.

27. The system of claim 16 wherein said data processing unit during the performance of diagnostic operations references a first series of test and verification routines used in testing different types of controllers, said processing unit using said first multibit binary code for selecting the starting entry point within said first series of routines so as to eliminate redundancies in said test and verification routines.

28. The system of claim 27 wherein said data processing unit upon completing the execution of the portion of said first series of routines, operates to reference a further group of routines for testing hardware changes made to said different types of controllers, said processing unit using said second multibit binary code for selecting the entry point within said group of routines so as to eliminate execution of routines for hardware changes not included within the controller being tested.

29. A memory system comprising n number of addressable controllers each constructed from each controller for controlling the operation of a memory including a plurality of memory modules, said controllers being remotely coupled in common to a bus for receiving memory commands and data from a data processing unit connected to said bus, each memory command including a multibit address portion having a plurality of address bits coded to specify which one of said controllers is to perform the operation specified by said command, said memory controller each including:

a multibit identification register for storing indications defining the construction characteristics of said controller, said register being coupled to said bus;

control section including:

first circuit means coupled to said identification register, said first circuit means having a number of pairs of input and output terminals, said input terminals of each pair being prewired to a ground reference voltage, said output terminals of said pairs being selectively prewired to corresponding input terminals of said pairs for generating a first multibit binary code at said output terminals designating the functionality of said controller;

second circuit means coupled to said identification register, said second circuit means having a number of pairs of input and output terminals, said input terminals of each pair being prewired to said ground reference potential, said output terminals of said pairs being selectively prewired to corresponding input terminals of said pairs for generating a second multibit binary code at said output terminals designating the hardware revision or said functionality; and, decode circuit means coupled to said bus, said decode circuit enabling said first and second multibit binary codes to be loaded into said register and said decode circuit means being operative in response to a first diagnostic predetermined type of memory command to condition said register to apply said first and second multibit binary codes to said bus for transfer to said data processing unit for establishing the types of controllers located at a remote location for facilitating the testing of said controllers.

30. The system of claim 29 wherein said each controller includes a plurality of sections and further includes:

a status register operatively coupled to said bus, said status register including a pair of series connected registers, a first register of said pair being connected to different ones of said plurality sections for storing status signals indicative of the operational characteristics of corresponding ones of said sections used for isolating memory faults and a second register of said pair being connected to said first register for storing said status signals received from said first register, said second register being coupled to said bus and to said decode circuit means; and said decode circuit means being operative in response to a second predetermined type of memory command to generate a second output signals for conditioning said second register to apply said status signals to said bus for transfer to said data processing unit.

31. The system of claim 30 wherein said data processing unit includes means for storing said first and second multibit binary codes and said status signals, and means for interpreting said status signals using said first and second multibit binary codes to determine whether or not said controller is faulty.

32. The system of claim 29 wherein each of said first circuit means of said controllers is prewired to generate said first multibit binary code which is sequentially preassigned for designating successive controller designs having different functionalities requiring different artworks.

33. The system of claim 32 wherein said first circuit means included in each of said controllers constructed from a first design having a first functionality prewired to generate said first multibit binary code precoded to have an all ZERO value.

34. The system of claim 32 wherein said first circuit means included in each of said controllers constructed from a second design having a second functionality is prewired to generate said first multibit binary code precoded to have a value 0001.

35. The system of claim 32 wherein each of said second circuit means of said controllers is prewired to generate said second multibit binary code which is sequentially preassigned for designating successive hardware revisions of the controller functionalities specified by said first multibit binary codes.

36. The system of claim 35 wherein said second circuit means included in each of said controllers constructed from an initial design having no hardware revisions is prewired to generate said second multibit binary code precoded to have an all ZERO value.

37. The system of claim 35 wherein said second circuit means included in each of said controllers constructed from a first hardware revision of the design specified by said first multibit binary code is prewired to generate said second multibit binary code precoded to have a value 001.

38. The system of claim 29 wherein said first circuit means includes:

a voltage source generating a voltage value corresponding to a binary ONE bit code;

a plurality of resistors corresponding in number to the number of bits included in said first multibit binary code, one end of each of said plurality of resistors being connected to said voltage source and the other end of each of said plurality of resistors being connected to a different one of said output terminals of said pairs; and, a plurality of jumpers corresponding in number to the number of binary ZERO bits contained in said first multibit binary code, said plurality of jumpers being prewired to connect those output terminals generating binary ZERO bit codes to corresponding ones of said plurality of input terminals so as to generate said first multibit code designating the design of said controller in which said first circuit means has been included.

39. The system of claim 29 wherein said second circuit means includes:

a voltage source generating a voltage value corresponding to a binary ONE bit code;

a plurality of resistors corresponding in number to the number of bits included in said second multibit binary code, one end of each of said plurality of resistors being connected to said voltage source and the other end of each of said plurality of resistors being connected to a different one of said output terminals of said pairs; and, a plurality of jumpers corresponding in number to the number of binary ZERO bits contained in said second multibit binary code, said plurality of jumpers being prewired to connect those output terminals generating binary ZERO bit codes to corresponding ones of said plurality of input terminals so as to generate said second multibit code designating the hardware revision of the controller design in which said second circuit means has been included.

40. The system of claim 29 wherein said data processing unit during the performance of diagnostic operations references a first series of test and verification routines used in testing different types of controllers, said processing unit using said first multibit binary code for selecting the starting entry point within said first series of routines so as to eliminate redundancies in the execution of controller test and verification routines.

41. The system of claim 40 wherein said data processing unit upon completing the execution of the portion of said first series of routines, operates to reference a further group of routines for testing hardware changes made to said different types of controllers, said processing unit using said second multibit binary code for selecting the entry point within said group of routines so as to eliminate execution of routines for hardware changes not included within the controller being tested.

* * * * *